US011888247B2

(12) United States Patent
Nakamura et al.

(10) Patent No.: US 11,888,247 B2
(45) Date of Patent: Jan. 30, 2024

(54) CONNECTOR ASSEMBLY INCLUDING CONNECTOR AND MATING CONNECTOR LOCKABLY MATEABLE WITH EACH OTHER

(71) Applicant: JAPAN AVIATION ELECTRONICS INDUSTRY, LIMITED, Tokyo (JP)

(72) Inventors: Keisuke Nakamura, Tokyo (JP); Tetsuya Komoto, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 49 days.

(21) Appl. No.: 17/525,152

(22) Filed: Nov. 12, 2021

(65) Prior Publication Data

US 2022/0216630 A1 Jul. 7, 2022

(30) Foreign Application Priority Data

Jan. 5, 2021 (JP) ................................ 2021-000377

(51) Int. Cl.
*H01R 12/70* (2011.01)
*H01R 12/71* (2011.01)

(52) U.S. Cl.
CPC ....... *H01R 12/7005* (2013.01); *H01R 12/716* (2013.01)

(58) Field of Classification Search
CPC .............. H01R 12/7005; H01R 12/716; H01R 12/712; H01R 12/714; H01R 12/73
(Continued)

(56) References Cited

U.S. PATENT DOCUMENTS 5,915,976 A * 6/1999 McHugh ............ H01R 13/6582 439/74
6,540,561 B1 * 4/2003 Masumoto ............. H01R 13/20 439/660
(Continued)

FOREIGN PATENT DOCUMENTS

JP 2003017162 A 1/2003
JP 2003217716 A 7/2003
(Continued)

OTHER PUBLICATIONS

Extended European Search Report (EESR) dated May 17, 2022, issued in counterpart European Application No. 21209309.0.
(Continued)

*Primary Examiner* — Marcus E Harcum
(74) *Attorney, Agent, or Firm* — Holtz, Holtz & Volek PC

(57) ABSTRACT

A connector assembly comprises a connector and a mating connector mateable with each other. The mating connector comprises a mating lock member having a mating lock portion. The connector comprises a holding member and a lock member. The holding member has a holding portion and a stop portion. The lock member has a held portion and a lock portion. The held portion is held by the holding portion. The lock portion is located below the mating lock portion and faces the mating lock portion in the upper-lower direction under the mated state. The coupling portion has an abutment portion. When the lock portion is moved toward the held portion in the first horizontal direction in accordance with removal of the connector from the mating connector, the abutment portion is brought into abutment with the stop portion so that a movement of the lock portion is restricted.

7 Claims, 15 Drawing Sheets

(58) Field of Classification Search
USPC .............................................................. 439/74
See application file for complete search history.

(56) References Cited

U.S. PATENT DOCUMENTS

| | | | | |
|---|---|---|---|---|
| 6,692,266 | B2 | 2/2004 | Hashiguchi et al. | |
| 6,971,922 | B2 * | 12/2005 | Shimizu | H01R 12/716 439/74 |
| 7,172,433 | B2 * | 2/2007 | Tsai | H01R 12/716 439/74 |
| 7,390,196 | B2 * | 6/2008 | Sasaki | H01R 12/716 439/74 |
| 7,637,786 | B2 * | 12/2009 | Hoshino | H01R 13/41 439/74 |
| 7,674,115 | B2 * | 3/2010 | Midorikawa | H01R 12/716 439/74 |
| 7,845,958 | B2 * | 12/2010 | Hoshino | H01R 12/7082 439/74 |
| 7,985,099 | B2 * | 7/2011 | Wu | H01R 12/714 439/74 |
| 7,993,146 | B2 * | 8/2011 | Midorikawa | H01R 12/716 439/74 |
| 8,398,425 | B2 * | 3/2013 | Suzuki | H01R 12/716 439/374 |
| 8,540,534 | B2 * | 9/2013 | Sato | H01R 13/11 439/74 |
| 8,562,379 | B2 * | 10/2013 | Miyazaki | H01R 13/115 439/74 |
| 8,708,714 | B2 * | 4/2014 | Niitsu | H01R 12/716 439/74 |
| 8,840,406 | B2 * | 9/2014 | Hirata | H01R 13/26 439/74 |
| 8,979,552 | B2 * | 3/2015 | Kiryu | H01R 43/26 439/74 |
| 10,498,097 | B2 * | 12/2019 | Komoto | H01R 13/2442 |
| 10,516,228 | B2 * | 12/2019 | Takenaga | H01R 12/716 |
| 2006/0199403 | A1 * | 9/2006 | Tsai | H01R 12/716 439/74 |
| 2009/0023312 | A1 | 1/2009 | Zeng | |
| 2009/0221157 | A1 * | 9/2009 | Midorikawa | H01R 13/20 439/70 |
| 2010/0190383 | A1 | 7/2010 | Yamada et al. | |
| 2013/0012039 | A1 * | 1/2013 | Nose | H01R 12/716 439/74 |
| 2013/0137307 | A1 | 5/2013 | Huang et al. | |
| 2014/0273587 | A1 * | 9/2014 | Takenaga | H01R 13/20 439/345 |
| 2015/0140841 | A1 * | 5/2015 | Watanabe | H01R 12/7011 439/74 |
| 2015/0207248 | A1 * | 7/2015 | Takenaga | H01R 12/716 439/74 |
| 2018/0248287 | A1 * | 8/2018 | Ashibu | H01R 12/707 |

FOREIGN PATENT DOCUMENTS

| | | | |
|---|---|---|---|
| JP | 5023777 | B2 | 6/2012 |
| JP | 2020013647 | A | 1/2020 |

OTHER PUBLICATIONS

European Office Action dated Feb. 15, 2023, issued in counterpart European Application No. 21209309.0.

* cited by examiner

CONNECTOR ASSEMBLY INCLUDING CONNECTOR AND MATING CONNECTOR LOCKABLY MATEABLE WITH EACH OTHER

CROSS REFERENCE TO RELATED APPLICATIONS

This application is based on and claims priority under 35 U.S.C. § 119 to Japanese Patent Application No. JP 2021-000377 filed Jan. 5, 2021, the content of which is incorporated herein in its entirety by reference.

BACKGROUND OF THE INVENTION

This invention relates to a connector assembly comprising a connector and a mating connector mateable with each other.

For example, this type of connector assembly is disclosed in JPA 2003-017162 (Patent Document 1), the content of which is incorporated herein by reference.

Referring to FIG. 28, Patent Document 1 discloses a connector assembly 90 comprising a receptacle (connector) 92 and a plug (mating connector) 96 mateable with each other. The connector 92 comprises a receptacle contact (contact) 93. The contact 93 has a held portion 94 and a contact portion 95. The held portion 94 is held by a housing of the connector 92. The mating connector 96 comprises a plug contact (mating contact) 97. The mating contact 97 is formed with a step 98.

The contact 93 and the mating contact 97 are brought into contact with each other under a mated state where the connector 92 and the mating connector 96 are mated with each other. In detail, the contact portion 95 of the contact 93 is brought into contact with a part of the mating contact 97 which is located above the step 98. For example, when the mating connector 96 is moved upward from the connector 92 because of impact applied to the connector assembly 90, the contact portion 95 of the contact 93 is brought into abutment with the step 98. The tangent line CL passing the thus-located contact portion 95 is greatly inclined to the vertical line VL. According to this structure, the mating contact 97 hardly comes off the contact 93 even if the connector assembly 90 receives impact. Thus, the contact 93 and the mating contact 97 work as lock members which lock the mated state.

Referring to FIG. 28, the contact 93 and the mating contact 97 theoretically work as described above. However, the contact 93 has a curved shape and is resiliently deformed easily. For example, when the mating connector 96 receives a force due to impact and is moved upward from the connector 92, the contact portion 95 of the contact 93 is pushed by the step 98 and is moved toward the held portion 94. The thus-pushed contact 93 tends to be resiliently deformed so that the inclination of the tangent line CL relative to the vertical line VL becomes gentle. In other words, the illustrated contact angle θ tends to become smaller. As a result, the mating contact 97 might easily come off the contact 93. Therefore, a more reliable locking mechanism is required not only for the contact such as that of Patent Document 1 but also for a general locking member having a structure which is resiliently deformed easily.

SUMMARY OF THE INVENTION

It is therefore an object of the present invention to provide a new connector assembly which has a more reliable locking mechanism.

An aspect of the present invention provides a connector assembly comprising a connector and a mating connector. The connector is mateable with the mating connector, which is located below the connector in an upper-lower direction, along the upper-lower direction. The mating connector comprises a mating holding member and a mating lock member. The mating holding member holds the mating lock member. The mating lock member has a mating lock portion. The mating lock portion faces at least downward. The connector comprises a holding member and a lock member. The holding member has a holding portion and a stop portion. The lock member has a held portion, a lock portion and a coupling portion. The held portion is held by the holding portion. The lock portion and the mating lock portion are configured to lock a mated state where the connector and the mating connector are mated with each other. The coupling portion couples the held portion and the lock portion to each other. The lock portion is located below the mating lock portion and faces the mating lock portion in the upper-lower direction under the mated state. The coupling portion has an abutment portion. When the lock portion is moved toward the held portion in a first horizontal direction perpendicular to the upper-lower direction in accordance with removal of the connector from the mating connector under the mated state, the abutment portion is brought into abutment with the stop portion so that a movement of the lock portion is restricted.

According to an aspect of the present invention, when the lock portion is moved toward the held portion in the first horizontal direction in accordance with the removal of the connector from the mating connector under the mated state, the abutment portion is brought into abutment with the stop portion so that a movement of the lock portion is restricted. As a result, the lock member is prevented from being resiliently deformed in such a way that the lock portion easily come off the mating lock portion. Thus, an aspect of the present invention provides a new connector assembly which has a more reliable locking mechanism.

An appreciation of the objectives of the present invention and a more complete understanding of its structure may be had by studying the following description of the preferred embodiment and by referring to the accompanying drawings.

Figure 1:
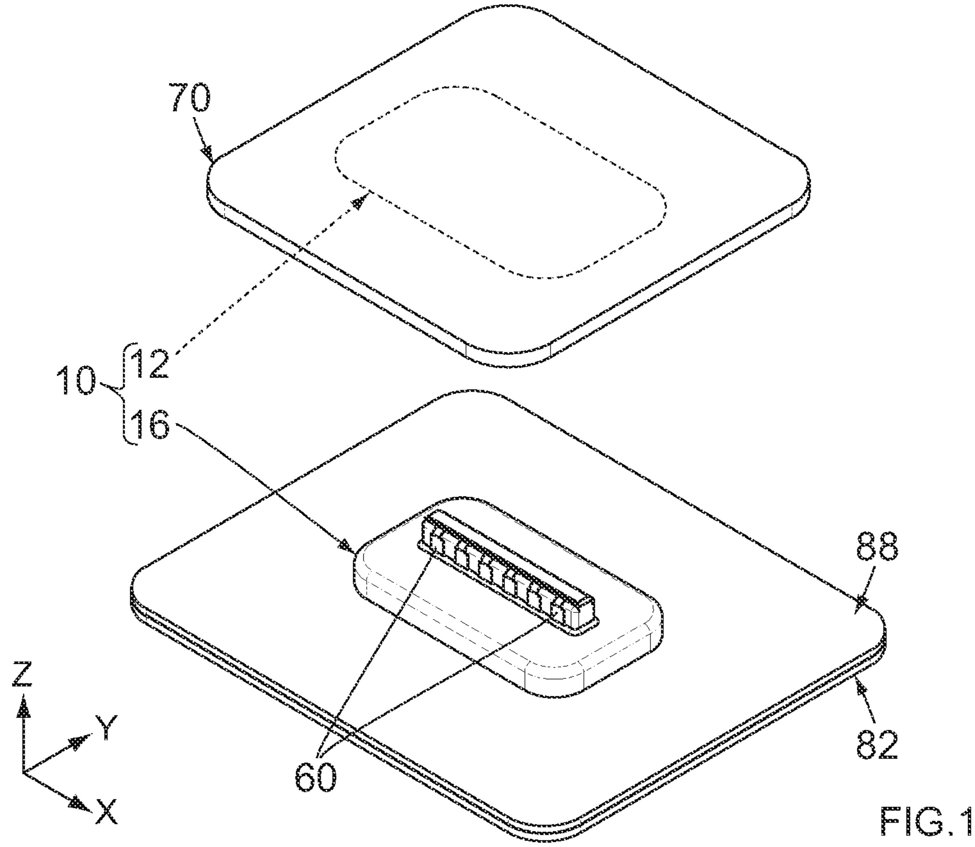
FIG. 1 is a perspective view showing a connector assembly according to an embodiment of the present invention, wherein a connector is attached to a board and is hidden behind the board, a position of the hidden connector is illustrated with dashed line, a mating connector is attached to a base member, and the connector and the mating connector of the connector assembly are under a separated state where they are separated from each other.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
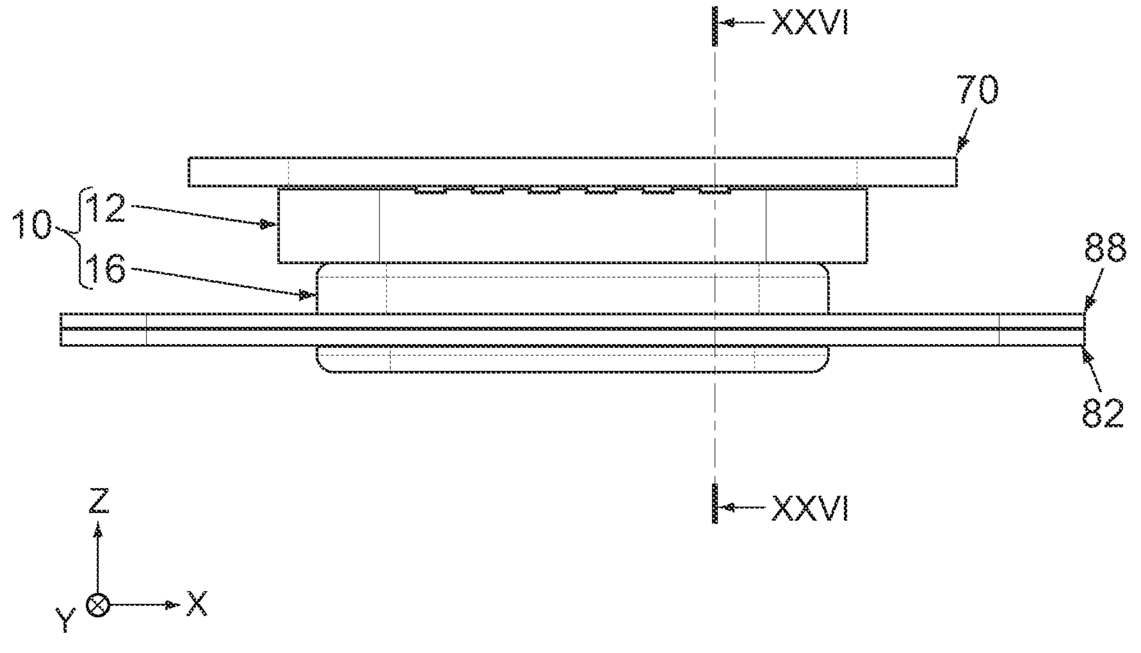
FIG. 2 is a side view showing the connector assembly of FIG. 1, wherein the connector and the mating connector are under a mated state where they are mated with each other.

Referring to FIGS. 1 and 2, a connector assembly 10 according to an embodiment of the present invention comprises a connector 12 and a mating connector 16. The connector 12 is mateable with the mating connector 16, which is located below the connector 12 in an upper-lower direction (Z-direction) and faces the negative Z-side of the connector 12, along the Z-direction.

The mating connector 16 of the present embodiment is attached to a bendable sheet member 82 and a base member 88 such as clothes. The connector 12 of the present embodiment is a so-called on-board connector. The connector 12 is mounted on a circuit board 70 of a module (not shown) which works as an electronic device. The module works under a mated state where the connector 12 and the mating connector 16 are mated with each other. However, the present invention is not limited thereto but is applicable to various connector assemblies. For example, the mating connector 16 may be an on-board connector configured to be mounted on a mating circuit board (not shown). In this instance, the connector 12 may be an on-board connector or may be attached to the sheet member 82 and the base member 88.

Hereafter, explanation will be made about the mating connector 16 of the present embodiment.

Figure 3:
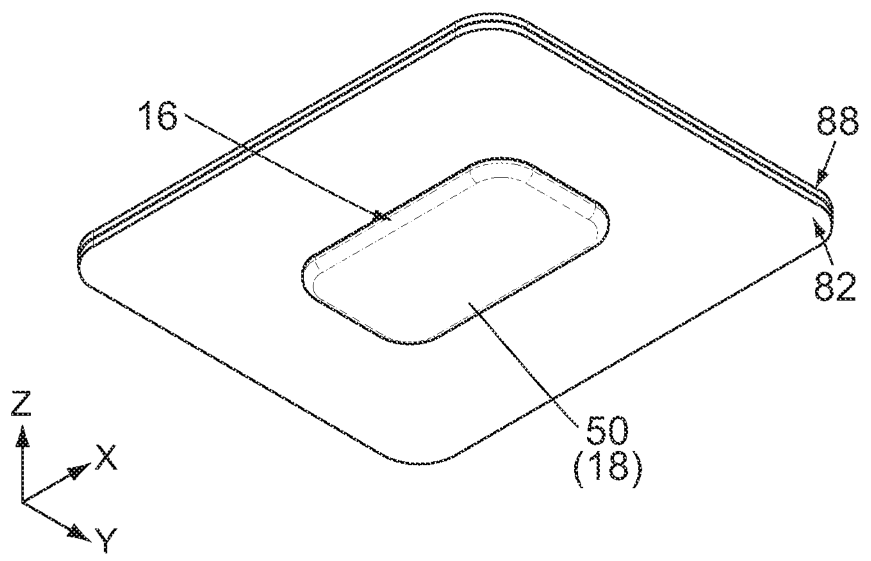
FIG. 3 is a perspective view showing the mating connector of FIG. 1, wherein the mating connector is attached to the base member.
Figure 4:
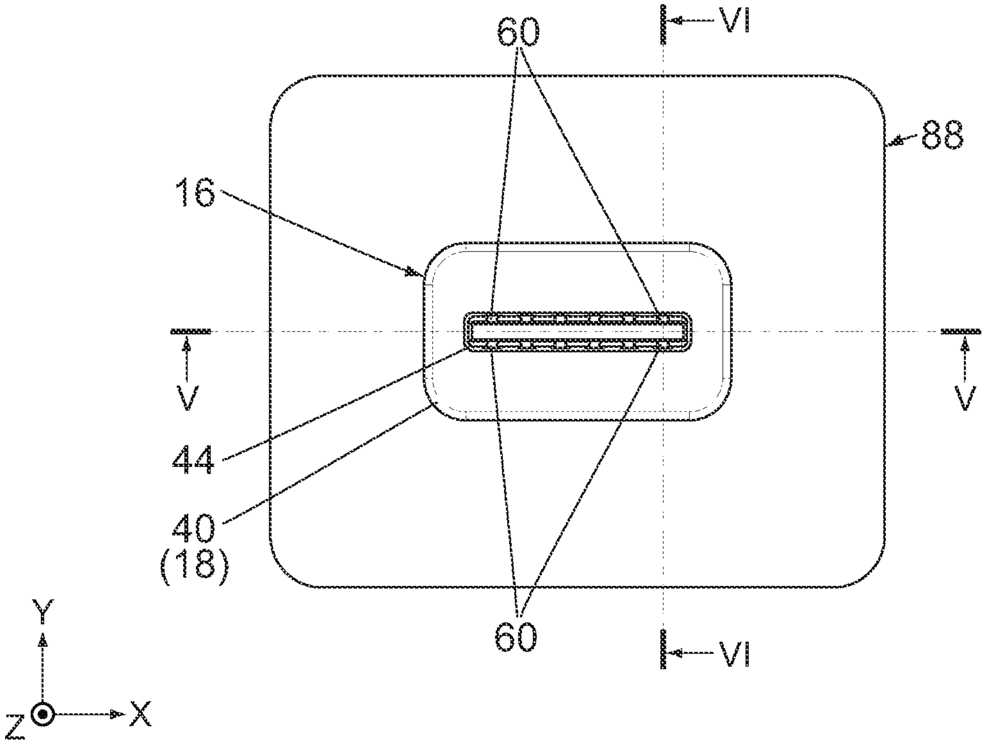
FIG. 4 is a top view showing the mating connector of FIG. 3.
Figure 7:
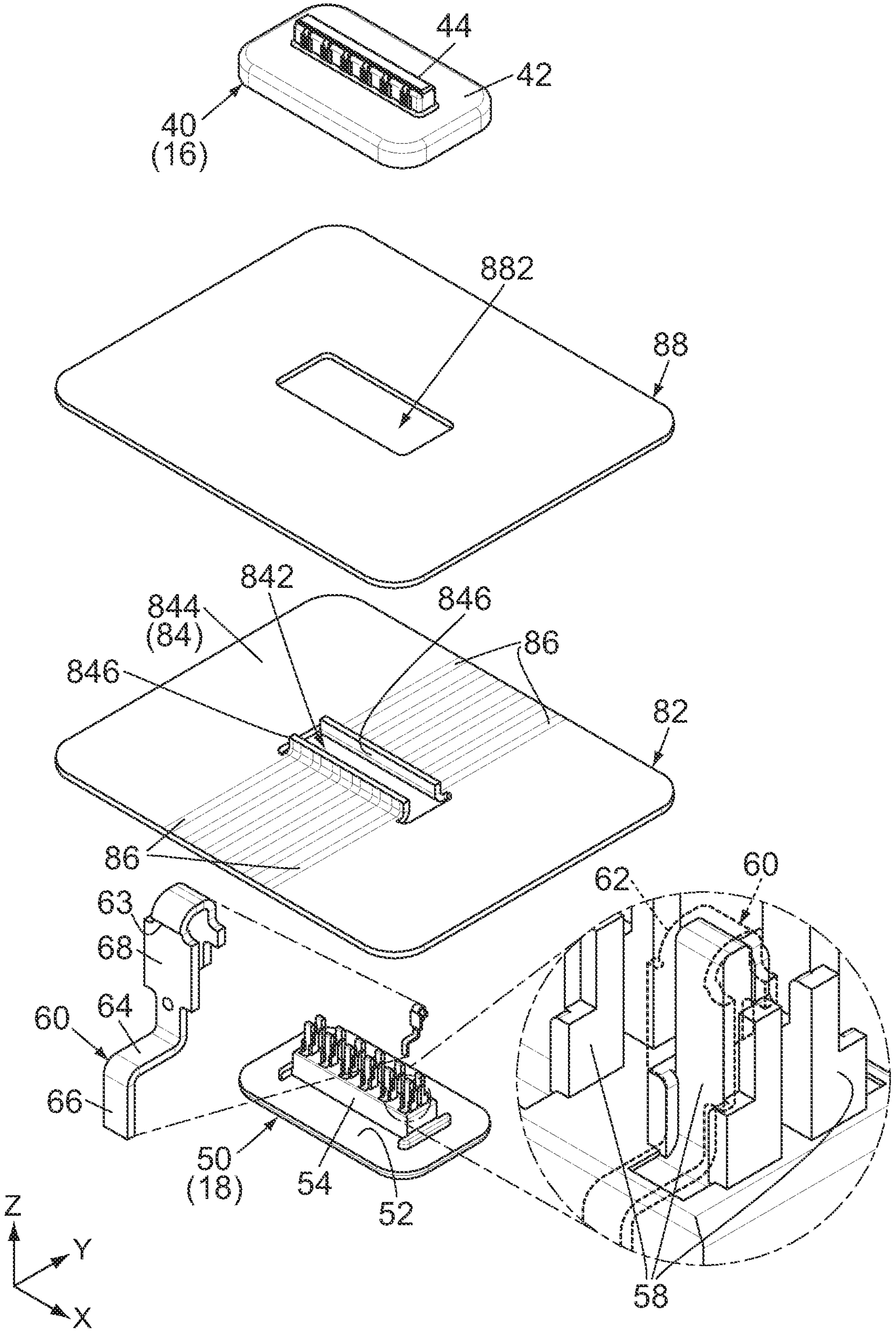
FIG. 7 is an exploded, perspective view showing the mating connector of FIG. 3, wherein only one of twelve mating contacts is illustrated, the illustrated mating contact is further enlarged and illustrated, a part of a lower holding member of the mating connector enclosed by chain dotted lines is enlarged and illustrated, and in the enlarged view, an outline (including a hidden part) of the mating contact attached to the lower holding member is illustrated with dashed line.

Referring to FIG. 7 together with FIGS. 3 and 4, the mating connector 16 of the present embodiment comprises a mating holding member 18 and a plurality of mating contacts 60 each made of conductor. Each of the mating contacts 60 of the present embodiment is a member for electrically connecting the mating connector 16 with the connector 12 (see FIG. 2). In addition, each of the mating contacts 60 works as a mating lock member 60 which locks the mated state. Thus, the mating connector 16 comprises the mating holding member 18 and a plurality of the mating lock members 60. The mating lock members 60 of the present embodiment have shapes same as each other. The mating holding member 18 of the present embodiment comprises an upper holding member 40 made of insulator and a lower holding member 50 made of insulator.

The mating connector 16 of the present embodiment comprises the aforementioned members. However, the present invention is not limited thereto. For example, the mating lock members 60 may have shapes different from each other. The number of the mating lock members 60 may be one. Each of the mating lock members 60 does not need to be a member for electrical connection. In this instance, the mating connector 16 may comprise another mating contact in addition to the mating lock members 60. Instead, the mating connector 16 may comprise another mating lock member in addition to the mating contacts 60. The upper holding member 40 and the lower holding member 50 may be members integral to each other. In other words, each of the upper holding member 40 and the lower holding member 50 is a part of the unitary mating holding member 18. Instead, the mating connector 16 may further comprise another member in addition to the aforementioned members.

Referring to FIG. 7, the lower holding member 50 of the present embodiment has a lower plate 52 and an accommodated portion 54. The lower plate 52 has a flat-plate shape in parallel to a horizontal plane (XY-plane) perpendicular to the Z-direction. The accommodated portion 54 is located at the middle of the lower plate 52 in the XY-plane. The accommodated portion 54 extends along a second horizontal direction (X-direction) perpendicular to the Z-direction. The accommodated portion 54 projects upward, or in the positive Z-direction, from an upper surface (positive Z-side surface) of the lower plate 52.

The lower holding member 50 of the present embodiment has a plurality of lower holding portions 58 in addition to the lower plate 52 and the accommodated portion 54. The lower holding portions 58 have shapes same as each other. Each of the lower holding portions 58 projects upward from an upper surface of the accommodated portion 54. The lower holding portions 58 are provided so as to correspond to the mating lock members 60, respectively. The lower holding portions 58 are divided into two rows in a first horizontal direction (Y-direction) perpendicular to both the X-direction and the Z-direction. The two rows of the lower holding portions 58 are arranged to be mirror images of each other with respect to a vertical plane (XZ-plane) defined by the X-direction and the Z-direction. The lower holding portions 58 of each row are arranged along the X-direction.

The lower holding member 50 of the present embodiment has the aforementioned structure. However, the present invention is not limited thereto, but the structure of the lower holding member 50 can be modified as necessary.

The upper holding member 40 of the present embodiment has an upper plate 42 and a received portion 44. The upper plate 42 has a flat-plate shape in parallel to the XY-plane. The received portion 44 is located at the middle of the upper plate 42 in the XY-plane. The received portion 44 extends along the X-direction. The received portion 44 projects upward from an upper surface of the upper plate 42.

Figure 8:
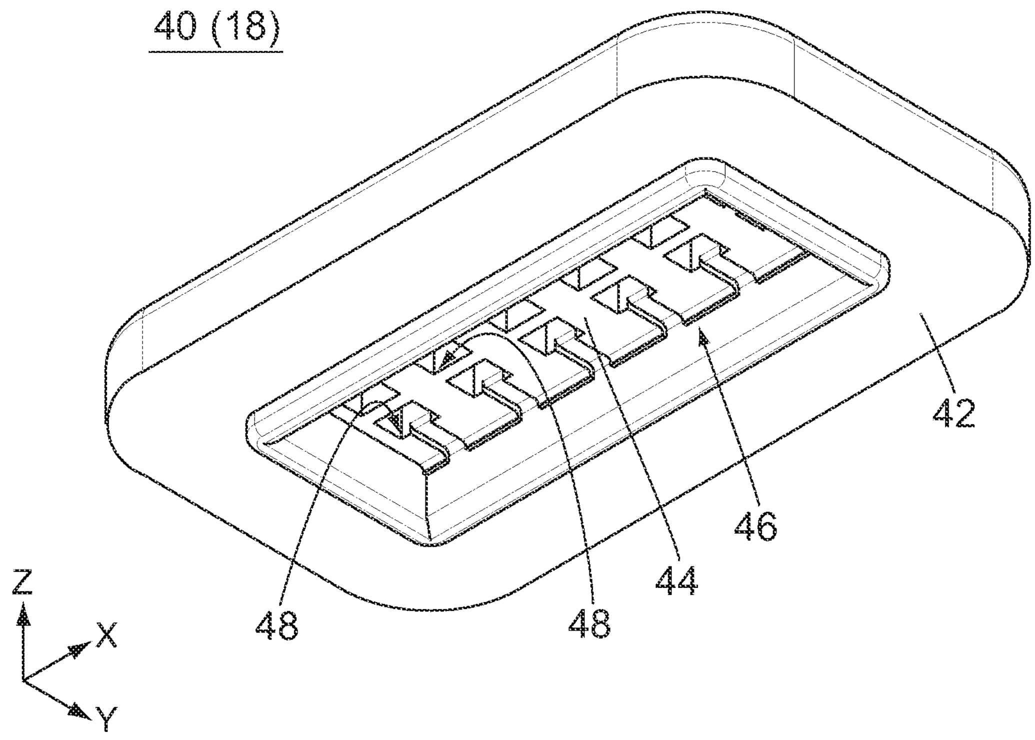
FIG. 8 is a perspective view showing an upper holding member of the mating connector of FIG. 7.

Referring to FIG. 8, the upper holding member 40 is formed with an accommodation portion 46. The accommodation portion 46 is a recess formed in the upper plate 42. The accommodation portion 46 is located at the middle of the upper plate 42 in the XY-plane. The accommodation portion 46 is recessed upward from a lower surface (negative Z-side surface) of the upper plate 42. Referring to FIG. 8 together with FIG. 7, the accommodation portion 46 has a shape corresponding to the accommodated portion 54 of the lower holding member 50, and the accommodated portion 54 is accommodatable therein.

Referring to FIG. 8, the upper holding member 40 is formed with a plurality of upper holding portions 48 in addition to the accommodation portion 46. Each of the upper holding portions 48 is a space formed in the received portion 44. The upper holding portions 48 have shapes same as each other. Each of the upper holding portions 48 is further recessed upward from an upper end (positive Z-side end) of the accommodation portion 46.

Referring to FIG. 8 together with FIG. 7, the upper holding portions 48 are provided so as to correspond to the mating lock members 60, respectively. Thus, the upper holding portions 48 correspond to the lower holding portions 58, respectively. The upper holding portions 48 are divided into two rows in the Y-direction. The two rows of the upper holding portions 48 are arranged to be mirror images of each other with respect to the XZ-plane. The upper holding portions 48 of each row are arranged along the X-direction. Each of the upper holding portions 48 has a shape corresponding to the lower holding portion 58, and the lower holding portion 58 is receivable therein.

The upper holding member 40 of the present embodiment has the aforementioned structure. However, the present invention is not limited thereto, but the structure of the upper holding member 40 can be modified as necessary.

Figure 5:
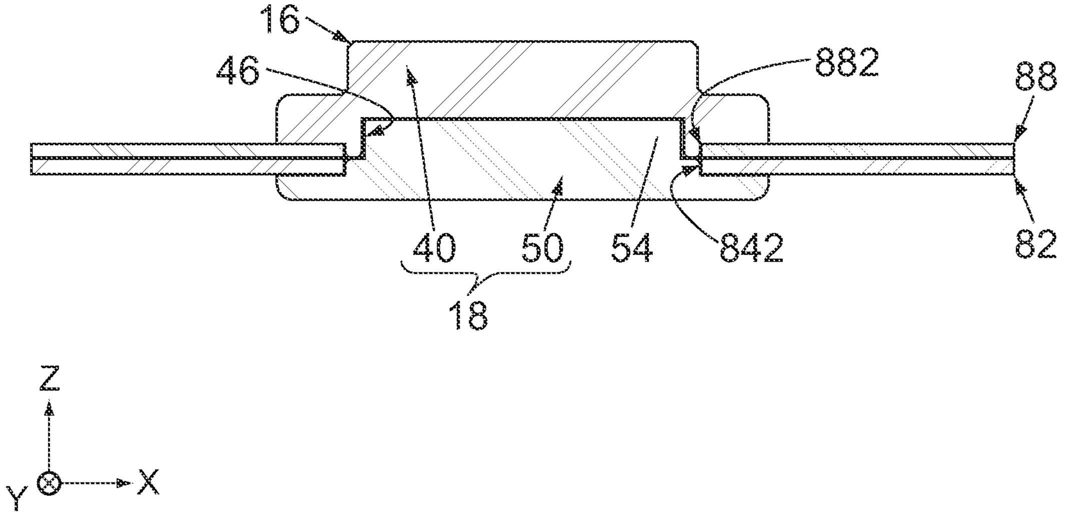
FIG. 5 is a cross-sectional view showing the mating connector of FIG. 4, taken along line V-V.
Figure 6:
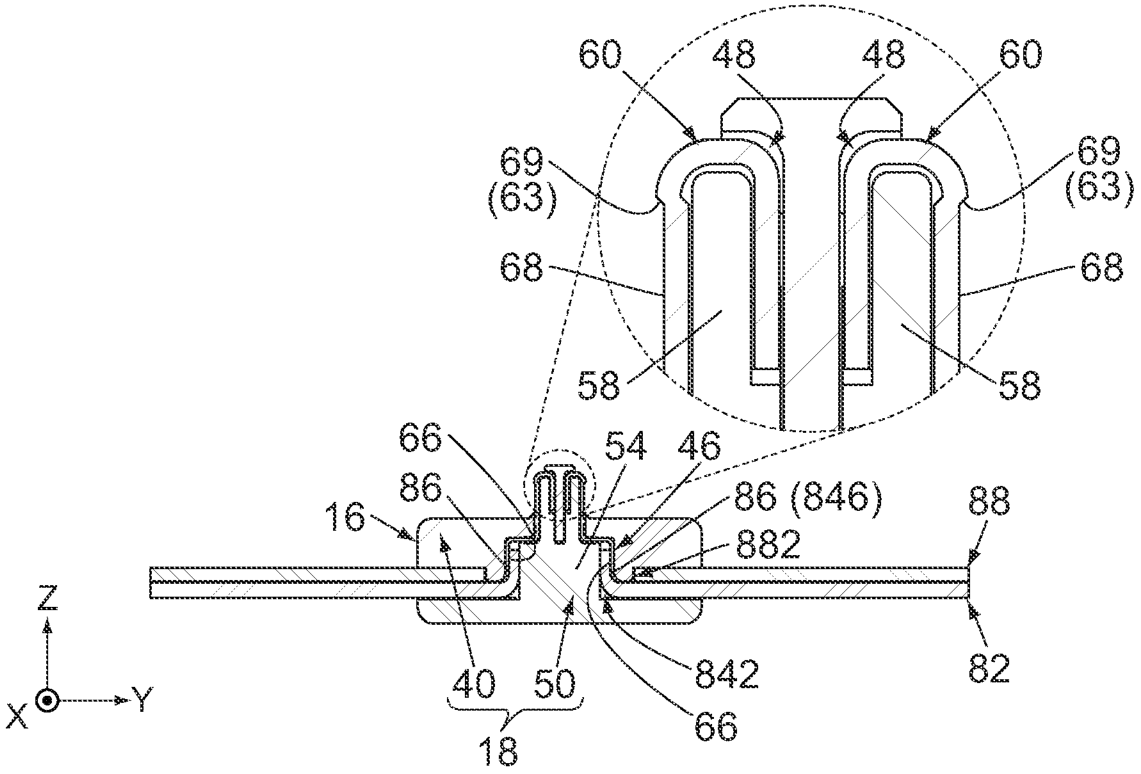
FIG. 6 is a cross-sectional view showing the mating connector of FIG. 4, taken along line VI-VI, wherein a part of the mating connector enclosed by dashed line is enlarged and illustrated.

Referring to FIG. 7, the mating lock members 60 are attached to the lower holding portions 58, respectively. Referring to FIGS. 1 and 4, the mating lock members 60 are divided into two rows in the Y-direction. The mating lock members 60 of each row are arranged along the X-direction. The two rows of the mating lock members 60 are arranged to be mirror images of each other with respect to the XZ-plane. Referring to FIGS. 5 and 6, the upper holding member 40 and the lower holding member 50 with the mating lock members 60 are combined to each other so as to sandwich and hold the base member 88 and the sheet member 82 therebetween in the Z-direction.

Referring to FIG. 7, the base member 88 extends along the XY-plane. The base member 88 is formed with an attachment hole 882. The attachment hole 882 passes through the base member 88 in the Z-direction. The attachment hole 882 has a shape and a size in the XY-plane which correspond to those of the accommodated portion 54 of the lower holding member 50.

The sheet member 82 comprises a thin insulation sheet 84 made of insulator. The insulation sheet 84 has a planar portion 844 and two connection pieces 846. The planar portion 844 is formed with an attachment hole 842. The attachment hole 842 passes through the insulation sheet 84 in the Z-direction. The attachment hole 842 has a shape and a size in the XY-plane which correspond to those of the accommodated portion 54 of the lower holding member 50. The two connection pieces 846 are located at opposite sides of the attachment hole 842 in the Y-direction. Each of the connection pieces 846 extends upward from the planar portion 844 as a whole.

The insulation sheet 84 has an upper surface formed with a plurality of conductive patterns 86. The conductive patterns 86 are provided so as to correspond to the mating lock members 60, respectively. The conductive patterns 86 are divided into two rows in the Y-direction. The conductive patterns 86 of each row are arrange along the X-direction. Each of the conductive patterns 86 extends along the insulation sheet 84 from an upper end of one of the connection pieces 846 to an end of the planar portion 844 in the Y-direction.

Referring to FIGS. 3 and 5, the base member 88 is placed on the sheet member 82. Referring to FIGS. 5 and 6, the attachment hole 842 of the sheet member 82 is located just under the attachment hole 882 of the base member 88. Referring to FIG. 6, the connection pieces 846 of the sheet member 82 extend upward through the attachment hole 882. Referring to FIGS. 5 and 6, the accommodated portion 54 of the lower holding member 50 extends through the attachment hole 842 and the attachment hole 882 and is accommodated in the accommodation portion 46 of the upper holding member 40.

Referring to FIG. 6, each of the mating lock members 60, which is attached to the lower holding member 50, is sandwiched between an inner wall of the corresponding upper holding portion 48 of the upper holding member 40 and the corresponding lower holding portion 58 of the lower holding member 50 and is thereby fixed to the mating holding member 18. In other words, the mating holding member 18 holds the mating lock members 60. The mating lock members 60 of the present embodiment are sandwiched between and held by the upper holding member 40 and the lower holding member 50. However, the present invention is not limited thereto. For example, the mating lock members 60 may be press-fit or insert-molded into the lower holding member 50.

Figure 9:
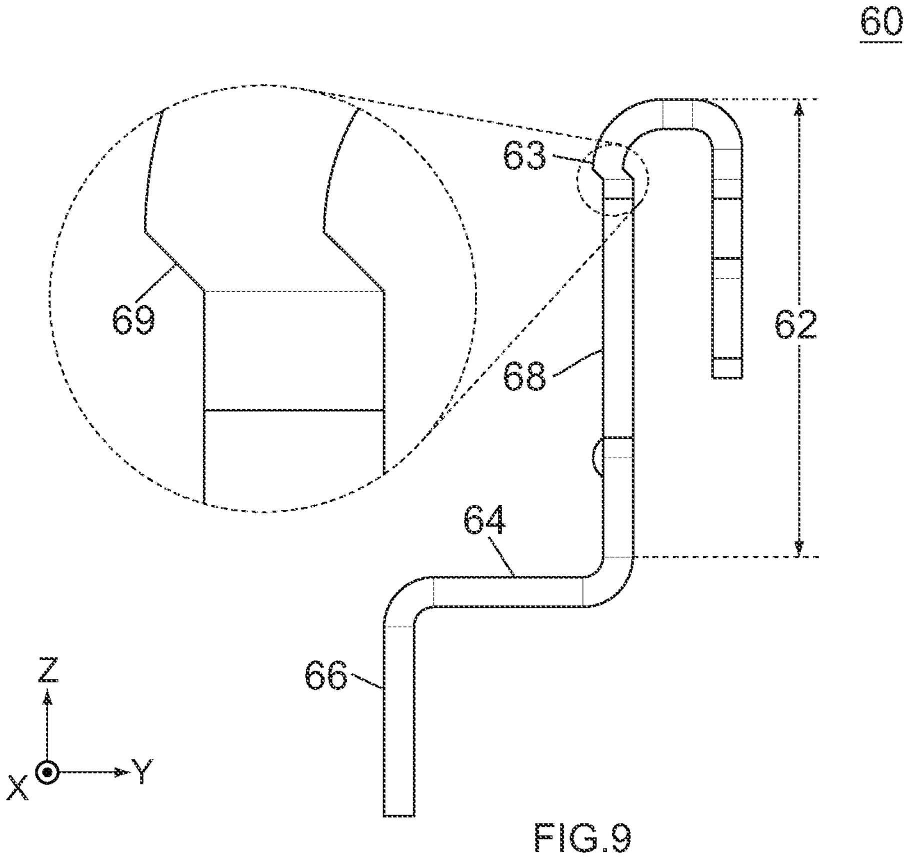
FIG. 9 is a side view showing the mating contact of the mating connector of FIG. 7, wherein a part of the mating contact enclosed by dashed line is enlarged and illustrated.

Referring to FIGS. 7 and 9, each of the mating lock members 60 of the present embodiment has a supported portion 62, a horizontal portion 64 and a mating connection portion 66. Each of these portions of each of the mating lock members 60 has the structure described below.

The supported portion 62 has two parts which arranged in the Y-direction and extend along the Z-direction. In addition, the supported portion 62 has another part which couples these two parts in the Y-direction. The mating connection portion 66 extends along the Z-direction. The horizontal portion 64 extends along the Y-direction and couples a lower end of the supported portion 62 and an upper end of the mating connection portion 66 to each other. Referring to FIG. 9, the supported portion 62 is formed with a projecting portion 63 and a mating contact portion 68. The projecting portion 63 is located in the vicinity of an upper end of the supported portion 62 and projects outward in the Y-direction. More specifically, the projecting portion 63 projects so as to be close to the mating connection portion 66 in the Y-direction. The mating contact portion 68 is a surface of the supported portion 62 which is located outward in the Y-direction. More specifically, the mating contact portion 68 is arranged toward the mating connection portion 66 in the Y-direction. The mating contact portion 68 is located under the projecting portion 63.

The projecting portion 63 of the present embodiment is formed with a mating lock portion 69 for locking the mated state. Thus, the mating lock member 60 has the mating lock portion 69. The mating lock portion 69 of the present embodiment is a lower surface of the projecting portion 63. The mating lock portion 69 faces downward and outward in the Y-direction. More specifically, the mating lock portion 69 is arranged toward the mating connection portion 66 in the Y-direction.

The structure of the mating lock portion 69 is not limited to the present embodiment. For example, the mating lock portion 69 may be formed on a part other than the projecting portion 63 of the mating lock member 60. For example, the supported portion 62 may be formed with a recess which is recessed so as to be away from the mating connection portion 66 in the Y-direction. In other words, this recess of the supported portion 62 may be recessed inward in the Y-direction. The mating lock portion 69 may be an upper wall surface (positive Z-side wall surface) of this recess. Instead, the supported portion 62 may be formed with a hole which passes through the supported portion 62 along the Y-direction. The mating lock portion 69 may be an upper wall surface of this hole. The mating lock portion 69 may face only downward. Thus, the mating lock portion 69 should face at least downward.

Each of the mating lock members 60 of the present embodiment has the aforementioned structure. However, the present invention is not limited thereto, but the structure of each of the mating lock members 60 can be modified as necessary.

Referring to FIG. 7, when each of the mating lock members 60 is attached to the corresponding lower holding portion 58, the supported portion 62 is supported by the lower holding portion 58. Referring to FIG. 6, when the mating holding member 18 is attached to the sheet member 82 and the base member 88, the mating connection portions 66 of the mating lock members 60 are connected to the conductive patterns 86, respectively. Each of the mating lock portions 69 of the thus-connected mating lock members 60 is located above the mating holding member 18 and projects outward in the Y-direction. More specifically, each of the mating lock portions 69 projects so as to be away from the lower holding portion 58 in the Y-direction.

Hereafter, explanation will be made about the connector 12 (see FIG. 10) of the present embodiment.

Figure 10:
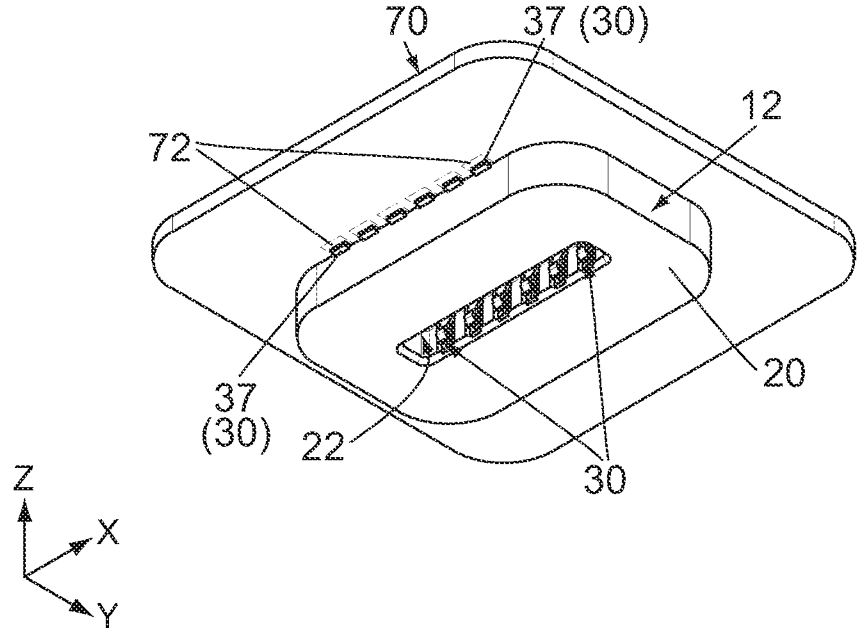
FIG. 10 is a perspective view showing the connector of FIG. 1, wherein the connector is attached to the board.

Referring to FIG. 10, the connector 12 of the present embodiment comprises a holding member 20 made of insulator and a plurality of contacts 30 each made of conductor. Each of the contacts 30 of the present embodiment is a member for electrically connecting the connector 12 with the mating connector 16 (see FIG. 2). In addition, each of the contacts 30 works as a lock member 30 which locks the mated state. Thus, the connector 12 comprises the holding member 20 and a plurality of the lock members 30. The lock members 30 of the present embodiment have shapes same as each other. The holding member 20 of the present embodiment is a unitary member.

Figure 26:
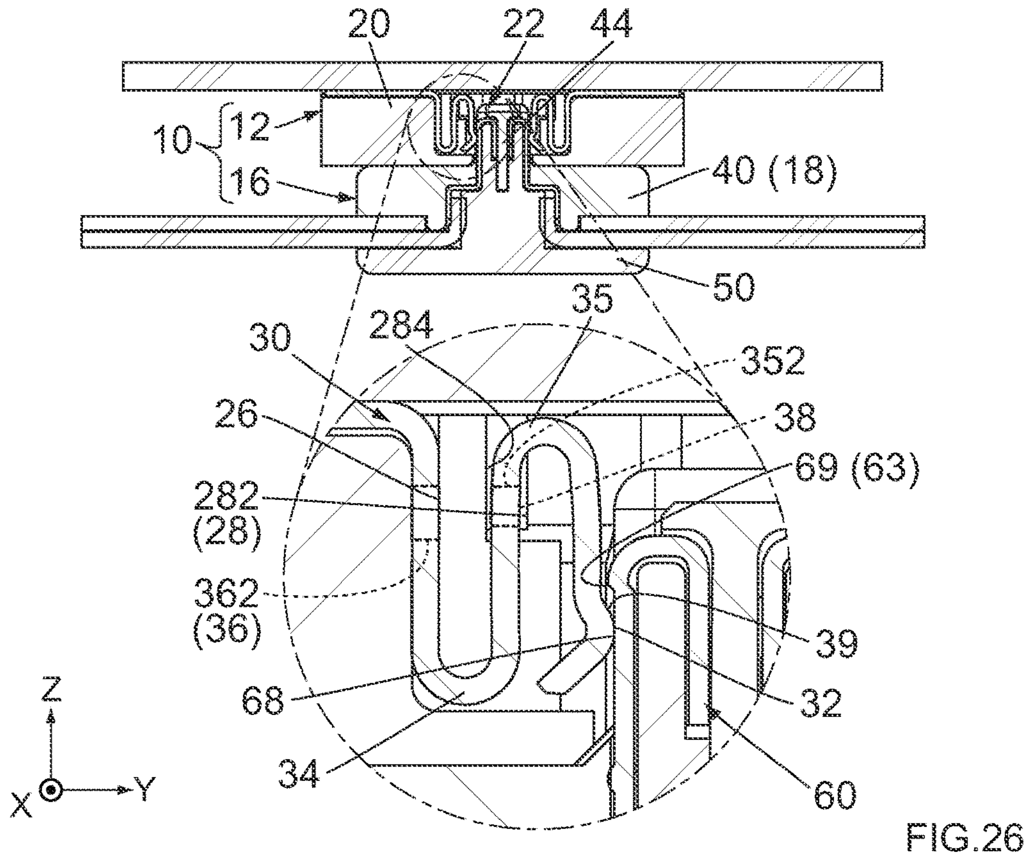
FIG. 26 is a cross-sectional view showing the connector assembly of FIG. 2, taken along line XXVI-XXVI, wherein a part of the connector assembly enclosed by chain dotted lines is enlarged and illustrated, and in the enlarged view, outlines of the hidden press-fit projection and the hidden guide projection of the contact are illustrated with dashed line.

Referring to FIG. 26, the contacts 30 are provided so as to correspond to the mating contacts 60 of the mating connector 16, respectively. In other words, the mating connector 16 comprises a plurality of the mating contacts 60 which correspond to the contacts 30, respectively.

Referring to FIG. 10, the connector 12 of the present embodiment comprises the aforementioned members. However, the present invention is not limited thereto. For example, the lock members 30 may have shapes different from each other. The number of the lock members 30 may be one. Each of the lock members 30 does not need to be a member for electrical connection. In this instance, the connector 12 may comprise another contact in addition to the lock members 30. Instead, the connector 12 may comprise another lock member in addition to the contacts 30. The holding member 20 may be formed of a plurality of members which are combined to each other. Instead, the connector 12 may further comprise another member in addition to the aforementioned members.

Figure 11:
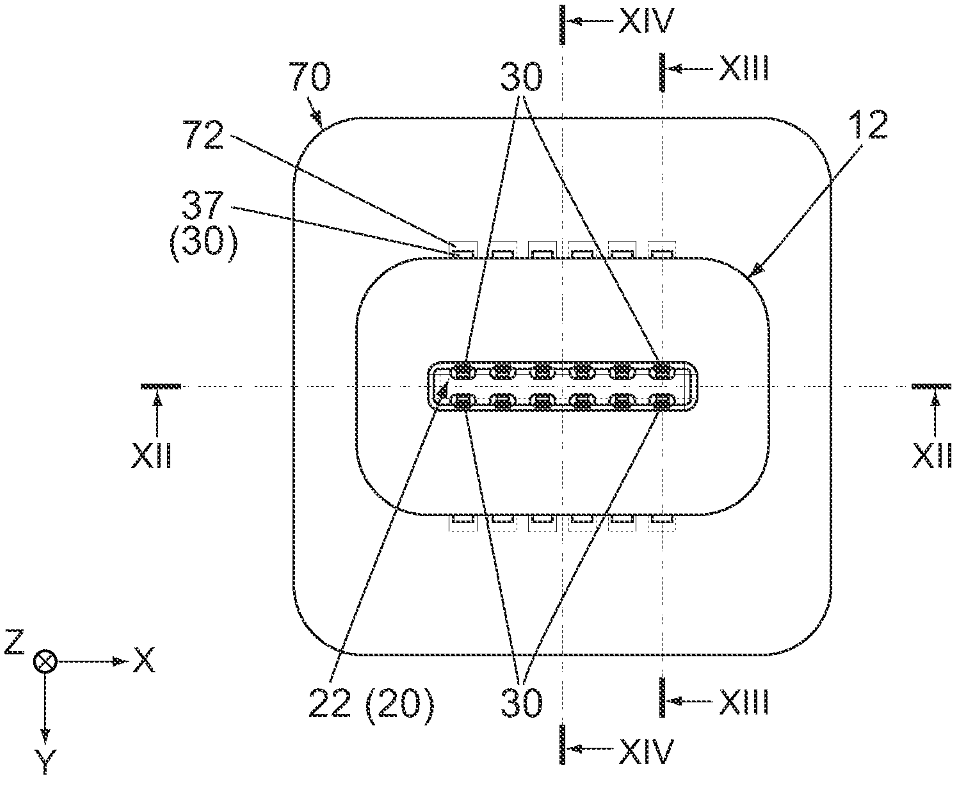
FIG. 11 is a bottom view showing the connector of FIG. 10.
Figure 12:
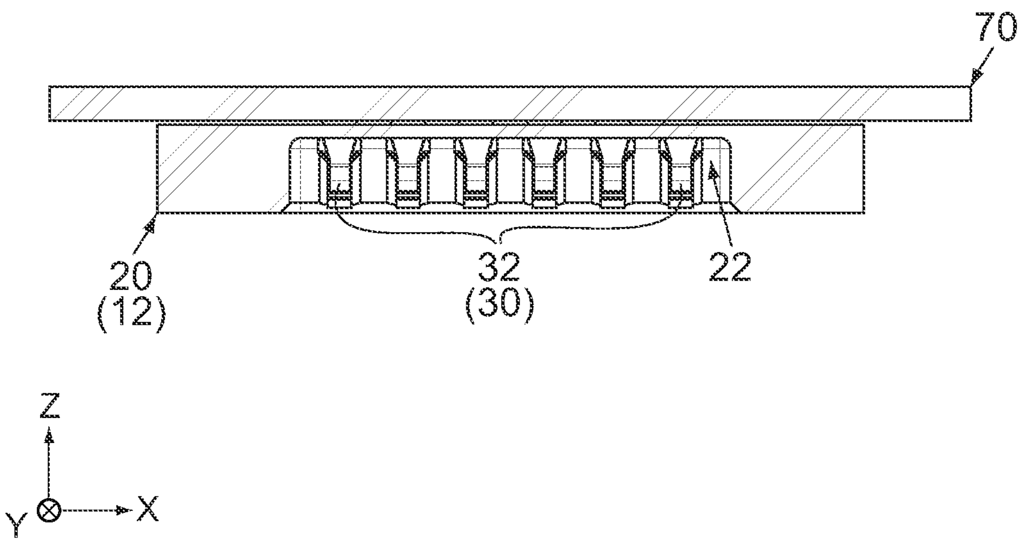
FIG. 12 is a cross-sectional view showing the connector of FIG. 11, taken along line XII-XII.

Referring to FIGS. 10 to 12, the holding member 20 of the present embodiment has a flat-plate shape in parallel to the XY-plane. Referring to FIGS. 10, 14, 15 and 22, the holding member 20 is formed with a receiving portion 22. The receiving portion 22 is a recess formed in the holding member 20. The receiving portion 22 is recessed upward from a lower surface of the holding member 20. The receiving portion 22 is located at the middle of the holding member 20 in the XY-plane. The receiving portion 22 extends along the X-direction.

Figure 13:
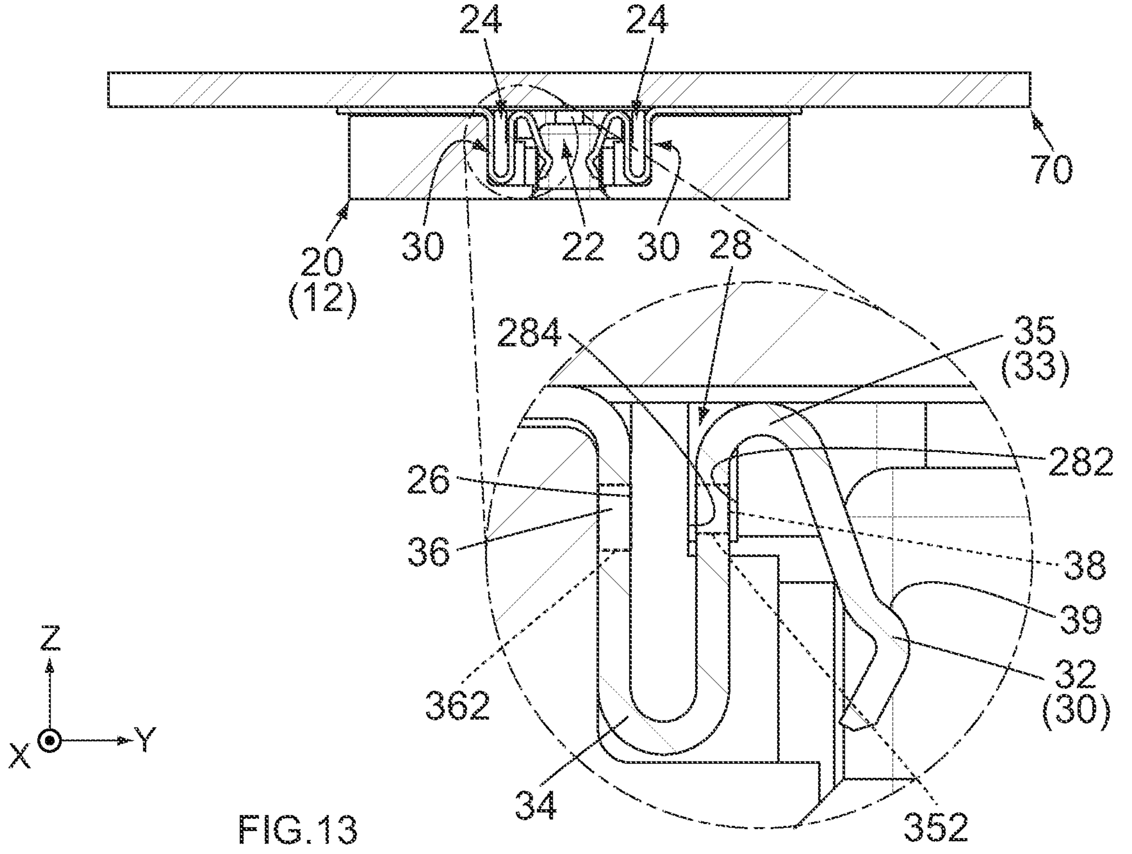
FIG. 13 is a cross-sectional view showing the connector of FIG. 11, taken along line XIII-XIII, wherein a part of the connector enclosed by chain dotted lines is enlarged and illustrated, and in the enlarged view, outlines of a hidden press-fit projection and a hidden guide projection of a contact are illustrated with dashed line.
Figure 14:
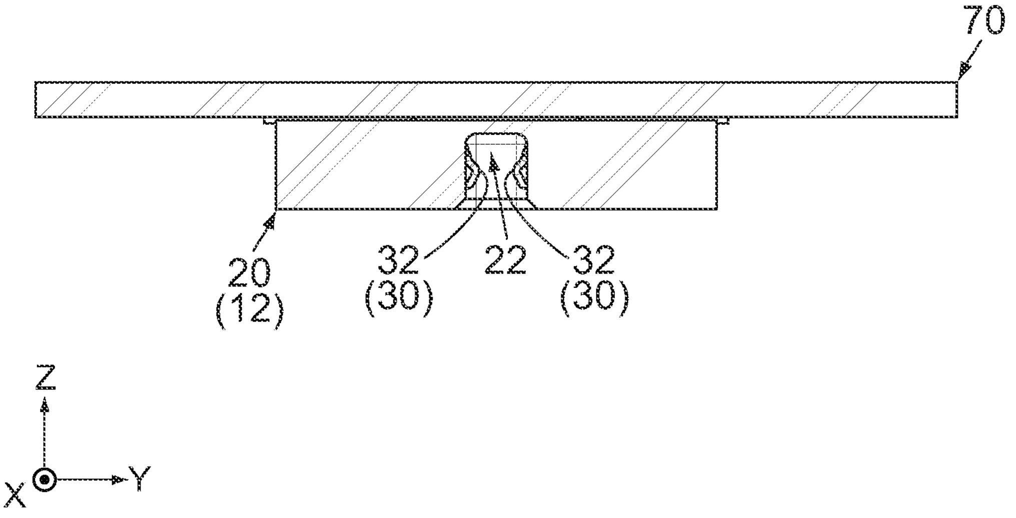
FIG. 14 is a cross-sectional view showing the connector of FIG. 11, taken along line XIV-XIV.
Figure 16:
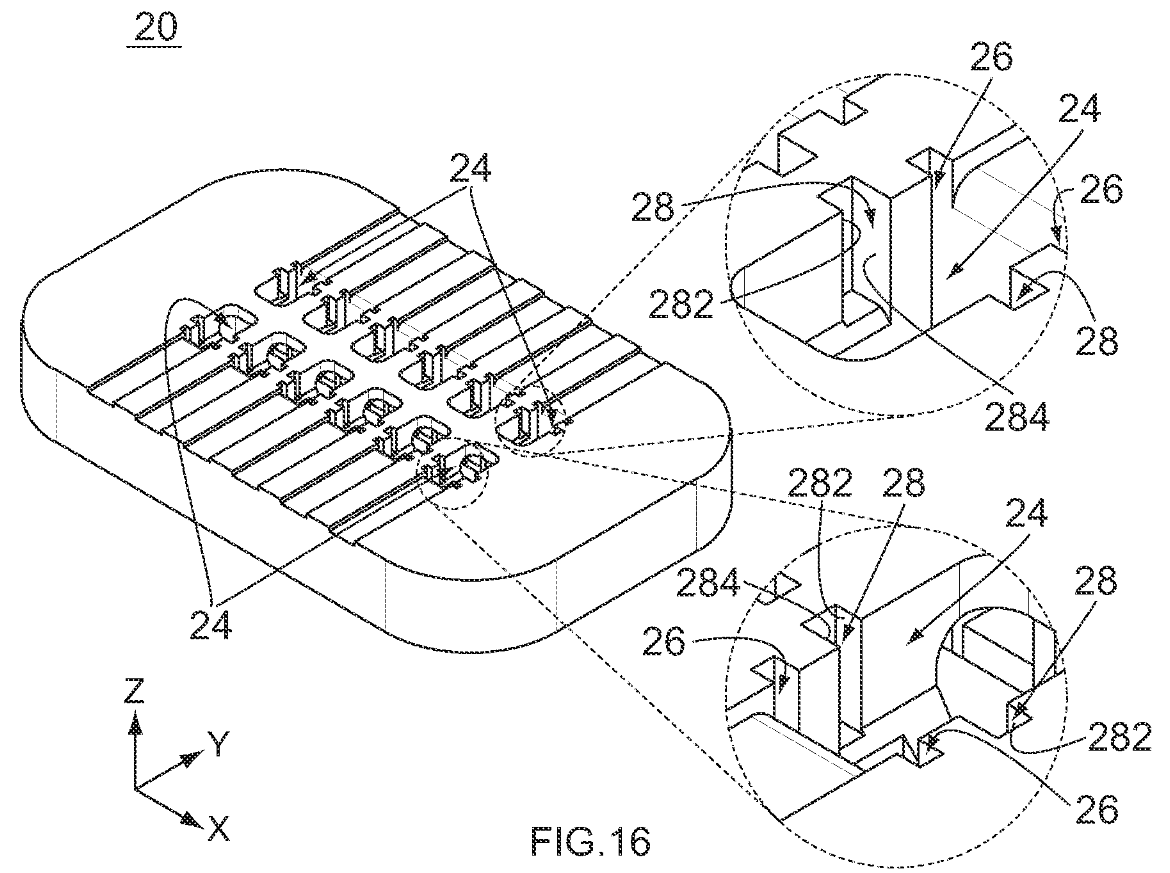
FIG. 16 is a perspective view showing a holding member of the connector of FIG. 15, wherein two parts of the holding member each enclosed by dashed line are enlarged and illustrated.
Figure 20:
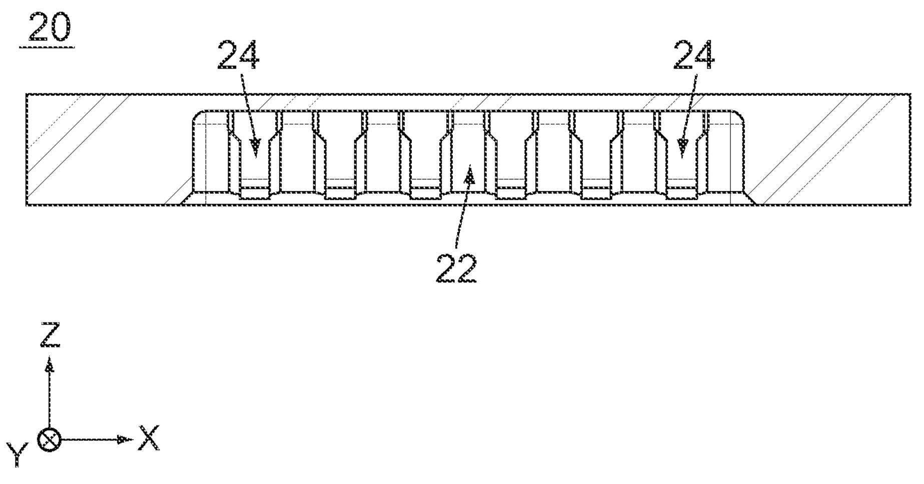
FIG. 20 is a cross-sectional view showing the holding member of FIG. 17, taken along line XX-XX.
Figure 21:
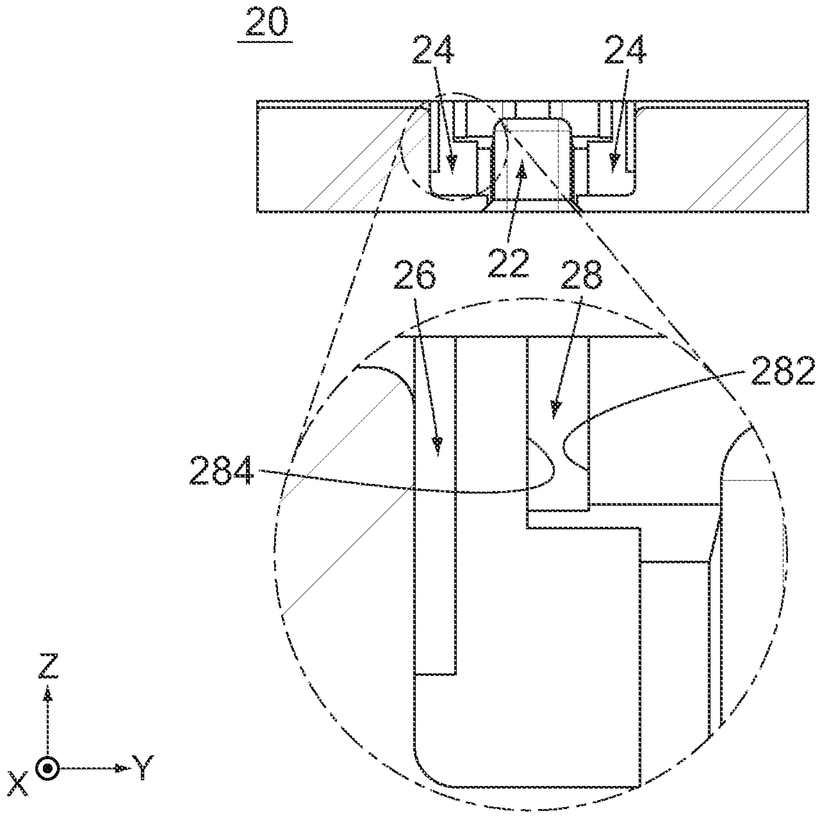
FIG. 21 is a cross-sectional view showing the holding member of FIG. 17, taken along line XXI-XXI, wherein a part of the holding member enclosed by chain dotted lines is enlarged and illustrated.
Figure 22:
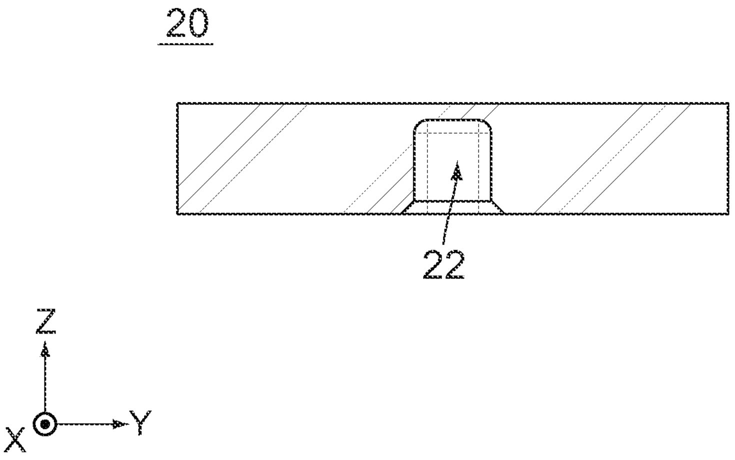
FIG. 22 is a cross-sectional view showing the holding member of FIG. 17, taken along line XXII-XXII.

Referring to FIGS. 13 and 16, the holding member 20 of the present embodiment is formed with a plurality of accommodation holes 24 in addition to the receiving portion 22. Each of the accommodation holes 24 is a recess which is formed in the holding member 20 and has a bottom. Each of the accommodation holes 24 is recessed downward from an upper surface of the holding member 20. The accommodation hole 24 have shapes same as each other. The accommodation holes 24 are provided so as to correspond to the lock members 30, respectively. The accommodation holes 24 are divided into two rows in the Y-direction. The two rows of the accommodation holes 24 are arranged to be mirror images of each other with respect to the XZ-plane. The accommodation holes 24 of each row are arranged along the X-direction. Referring to FIGS. 13, 20 and 21, a lower part (negative Z-side part) of each of the accommodation holes 24 communicates with the receiving portion 22.

Referring to FIG. 16, each of the accommodation holes 24 is formed with two holding portions 26 and two guide channels 28. Thus, the holding member 20 is formed with the holding portions 26 and the guide channels 28. Each of the holding portions 26 and the guide channels 28 is an indent which is located in the accommodation hole 24. Each of the holding portions 26 and the guide channels 28 is recessed in the X-direction and extends in the Z-direction. In detail, each of the holding portions 26 and the guide channels 28 is recessed outward in the X-direction from an inner wall of the accommodation hole 24. Each of the holding portions 26 and the guide channels 28 extends along the Z-direction to open upward.

The two holding portions 26 of each of the accommodation holes 24 are located at positions same as each other in the Y-direction and face each other in the X-direction. Thus, the two holding portions 26 of each of the accommodation holes 24 are recessed so as to be away from each other in the X-direction. The two guide channels 28 of each of the accommodation holes 24 are located at positions same as each other in the Y-direction and face each other in the X-direction. Thus, the two guide channels 28 of each of the accommodation holes 24 are recessed so as to be away from each other in the X-direction. For each of the accommodation holes 24, the two holding portions 26 are located outward of the two guide channels 28 in the Y-direction, respectively.

Figure 17:
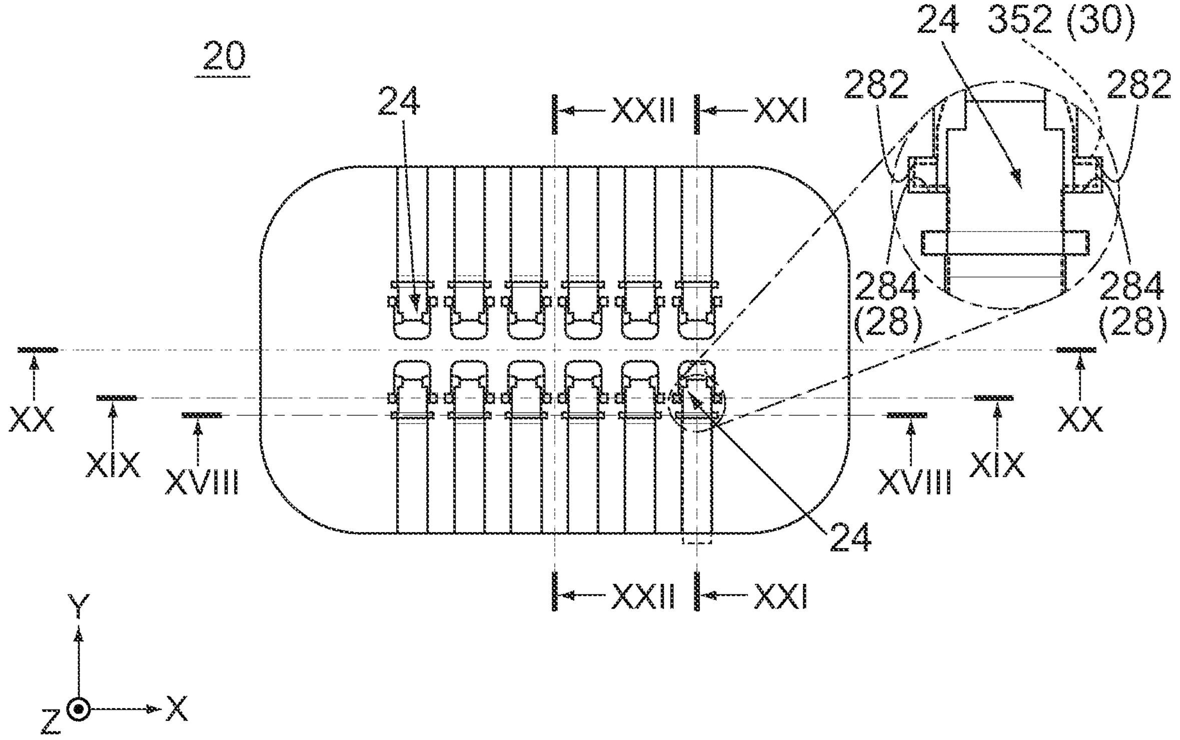
FIG. 17 is a top view showing the holding member of FIG. 16, wherein a part of the holding member enclosed by chain dotted lines is enlarged and illustrated, and in the enlarged view, an outline of the contact held by the holding member is partially illustrated with dashed line.

Referring to FIGS. 16 and 17, each of the guide channels 28 is formed with two inner walls 282 and 284. The two inner walls 282 and 284 of each of the guide channels 28 are apart from each other in the Y-direction. Each of the inner walls 282 and 284 of the present embodiment is a planer surface perpendicular to the Y-direction. However, the present invention is not limited thereto. For example, each of the inner walls 282 and 284 may be oblique to the Y-direction. Thus, each of the guide channels 28 may be formed with the inner walls 282 and 284 each intersecting with the Y-direction.

As described later, each of the inner walls 282 works as a stop portion 282 which is configured to partially catch and stop the lock member 30, and each of the inner walls 284 works as a facing portion 284 which faces the stop portion 282. Thus, the inner wall of each of the guide channels 28 of the present embodiment includes the two inner walls 282 and 284, wherein one of the two inner walls 282 and 284 works as the stop portion 282, and a remaining one of the two inner walls 282 and 284 works as the facing portion 284.

The holding member 20 of the present embodiment has the aforementioned structure. In particular, the holding member 20 has the holding portions 26, the stop portions 282 and the facing portions 284. However, the present invention is not limited thereto. The structure of the holding member 20 can be modified as necessary, provided that the holding member 20 has the holding portion 26 and the stop portion 282.

Referring to FIG. 13, the lock members 30 are attached to the holding member 20. Referring to FIG. 11, the lock members 30 are divided into two rows in the Y-direction. The lock members 30 of each row are arranged along the X-direction. The two rows of the lock members 30 are arranged to be mirror images of each other with respect to the XZ-plane. Referring to FIG. 10, the holding member 20 with the lock members 30 is mounted on a lower surface of the circuit board 70.

Figure 15:
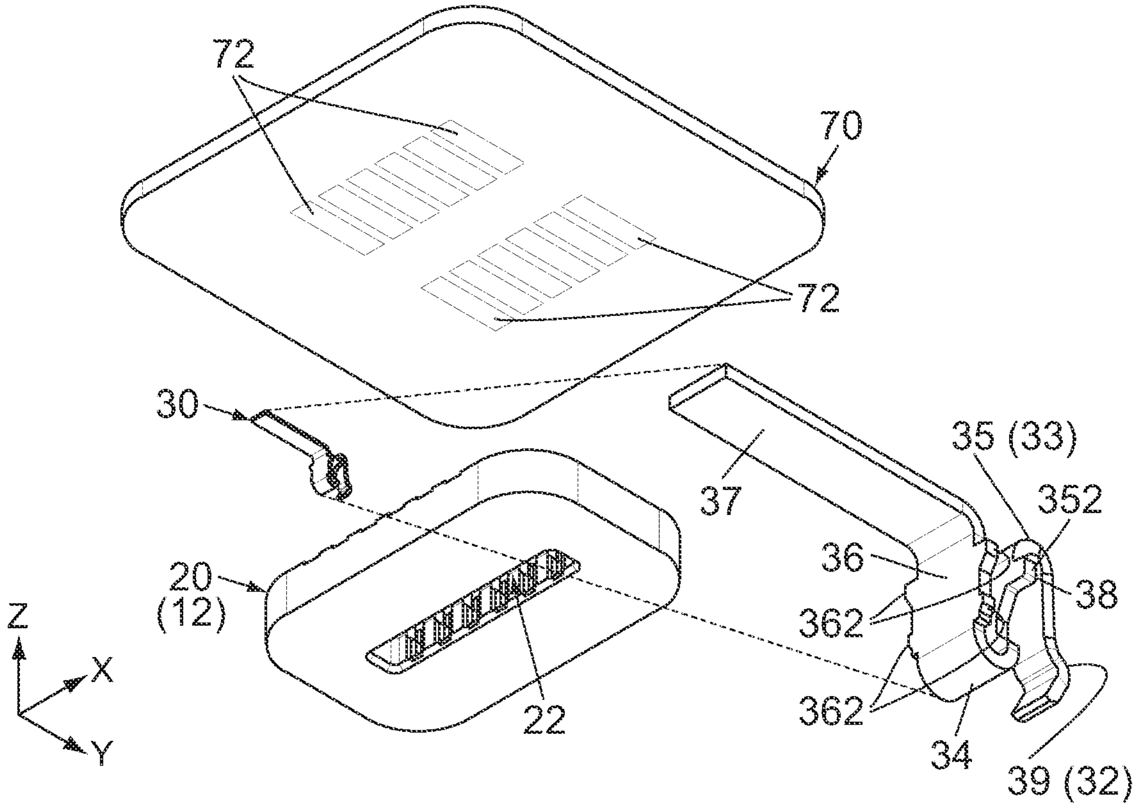
FIG. 15 is an exploded, perspective view showing the connector of FIG. 10, wherein only one of twelve contacts is illustrated, and the illustrated contact is further enlarged and illustrated.

Referring to FIG. 15, the circuit board 70 extends along the XY-plane. The lower surface of the circuit board 70 is formed with a plurality of conductive pads 72. Referring to FIG. 11, the conductive pads 72 are provided so as to correspond to the lock members 30, respectively. Referring to FIG. 15, the conductive pads 72 are divided into two rows in the Y-direction. The conductive pads 72 of each row are arranged along the X-direction. Each of the conductive pads 72 extends along the Y-direction.

Referring to FIGS. 15 and 23 to 25, each of the lock members 30 of the present embodiment has a lock projection 32 for locking the mated state, a coupling portion 33, a held portion 36 and a connection portion 37. For each of the lock members 30, each portion has the structure described below.

Figure 24:
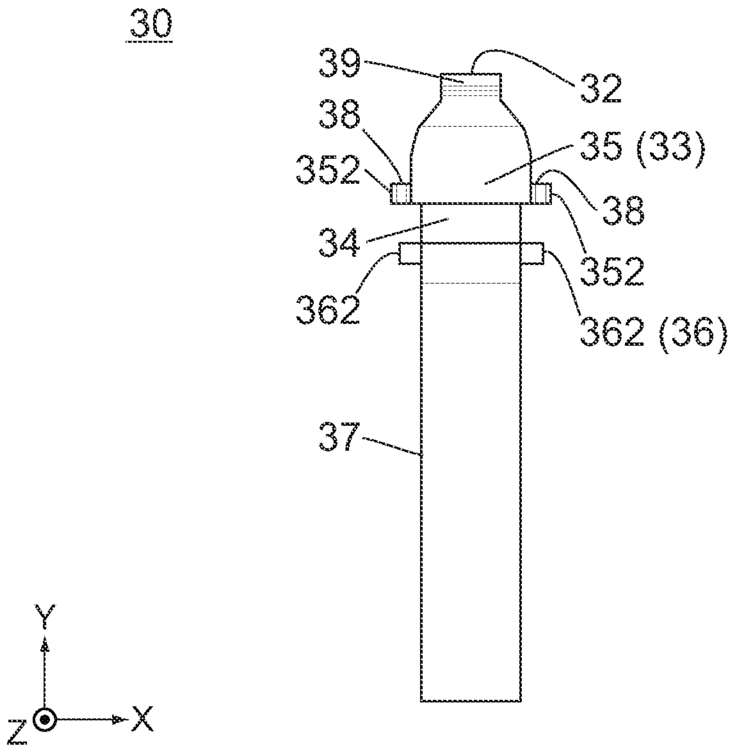
FIG. 24 is a top view showing the contact of FIG. 23.
Figure 25:
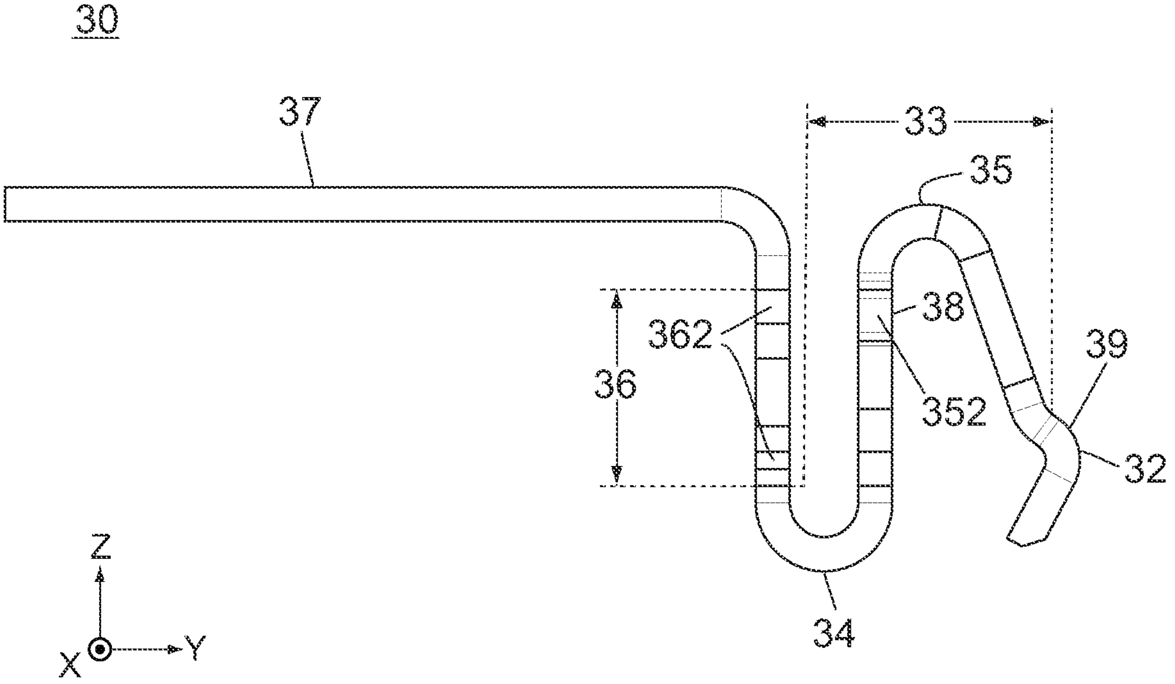
FIG. 25 is a side view showing the contact of FIG. 23.

Referring to FIGS. 15, 24 and 25, the lock projection 32 and the connection portion 37 are located at opposite sides of the lock member 30 in the Y-direction, respectively. The held portion 36 is located between the lock projection 32 and the connection portion 37 in the Y-direction and extends along the Z-direction. The lock projection 32 projects inward in the Y-direction. More specifically, the lock projection 32 extends along the Z-direction as a whole while projecting in arc so as to be away from the connection portion 37 and the held portion 36 in the Y-direction. The coupling portion 33 couples an upper end of the lock projection 32 and a lower end of the held portion 36 to each other. The connection portion 37 extends from an upper end of the held portion 36 along the Y-direction as a whole so as to be away from the lock projection 32.

Referring to FIGS. 15 and 25, the coupling portion 33 is resiliently deformable. In particular, the coupling portion 33 of the present embodiment has a meander shape in a predetermined plane (YZ-plane) defined by the Y-direction and the Z-direction and has a long spring length. In other words, the coupling portion 33 is a so-called soft spring and is easy to be resiliently deformed.

More specifically, the coupling portion 33 of the present embodiment has a first bent portion 34 and a second bent portion 35. The first bent portion 34 has a U-like shape. The second bent portion 35 has a reversed U-like shape. The thus-formed coupling portion 33 has an S-like shape in the YZ-plane. This shape enables the lock member 30 to have a long spring length even when the lock member 30 is reduced in size in the Z-direction. However, the present invention is not limited thereto. For example, the first bent portion 34 may have a reversed U-like shape, and the second bent portion 35 may have a U-like shape. Moreover, the coupling portion 33 may have only one of or none of the first bent portion 34 and the second bent portion 35.

In the present embodiment, the first bent portion 34 is connected to the held portion 36, and the second bent portion 35 is connected to the lock projection 32. The thus-formed first bent portion 34 is located between the second bent portion 35 and the held portion 36 along a direction in which the lock member 30 extends. However, the present invention is not limited thereto. For example, the lock member 30 may have a shape which is obtained by vertically reversing the shape illustrated in FIG. 25. In this instance, the reversed U-like shaped second bent portion 35 may be connected to the held portion 36, and the U-like shaped first bent portion 34 may be connected to the lock projection 32. In other words, the second bent portion 35 may be located between the first bent portion 34 and the held portion 36 along a direction in which the lock member 30 extends.

Figure 23:
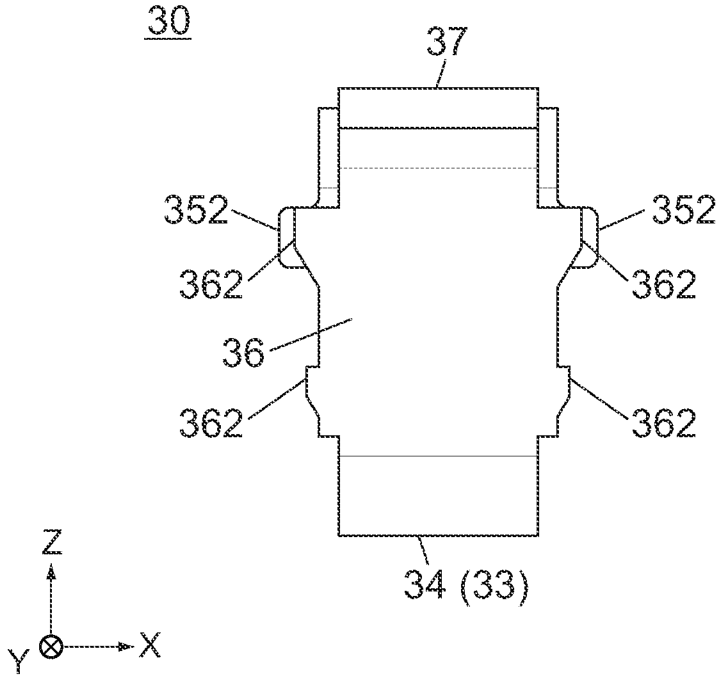
FIG. 23 is a front view showing the contact of the connector of FIG. 15.

Referring to FIGS. 15, 23 and 25, the held portion 36 of the present embodiment is formed with four press-fit projections 362. Thus, the lock member 30 of the present embodiment has the four press-fit projections 362. Each of the press-fit projections 362 of the present embodiment has a flat-plate shape in parallel to the XZ-plane. Two of the press-fit projections 362 are located on one of opposite sides of the held portion 36 in the X-direction, and the other two of the press-fit projections 362 are located on a remaining one of the opposite sides of the held portion 36 in the X-direction. Each of the press-fit projections 362 projects outward in the X-direction. Thus, two of the press-fit projections 362 project so as to be away from the other two of the press-fit projections 362 in the X-direction.

Referring to FIGS. 15, 24 and 25, the coupling portion 33 of the present embodiment is formed with two guide projections 352. Thus, the lock member 30 of the present embodiment has the two guide projections 352. As described later, each of the guide projections 352 is a portion which is configured to be caught and stopped by the stop portion 282 (see FIG. 16) of the holding member 20 (see FIG. 16). Each of the guide projections 352 of the present embodiment has a flat-plate shape in parallel to the XZ-plane. The guide projections 352 are located on opposite sides of the coupling portion 33 in the X-direction. Each of the guide projections 352 projects outward in the X-direction. Thus, the two guide projections 352 project so as to be away from each other in the X-direction.

The coupling portion 33 has two abutment portions 38. The abutment portions 38 of the present embodiment are provided so as to correspond to the two guide projections 352, respectively. Each of the abutment portions 38 is a part of the corresponding guide projection 352. In particular, each of the abutment portions 38 of the present embodiment is one of opposite surfaces of the corresponding guide projection 352 in the Y-direction which is nearer to the lock projection 32 than a remaining one of the opposite surfaces. However, the present invention is not limited thereto. For example, each of the abutment portions 38 may be the remaining one of the opposite surfaces of the corresponding guide projection 352 in the Y-direction which is farther from the lock projection 32 than the one of the opposite surfaces.

The lock projection 32 of the present embodiment is formed with a lock portion 39 for locking the mated state. Thus, the lock member 30 has the lock portion 39. The coupling portion 33 couples the held portion 36 and the lock portion 39 to each other. The lock portion 39 of the present embodiment is an upper surface of the lock projection 32. The lock portion 39 faces upward and inward in the Y-direction. More specifically, the lock portion 39 faces opposite to the held portion 36 in the Y-direction. However, the present invention is not limited thereto. For example, the lock portion 39 may be formed on a part other than the lock projection 32 of the lock member 30. The lock portion 39 may face only upward. Thus, the lock portion 39 may face at least upward.

Each of the lock members 30 of the present embodiment has the aforementioned structure. However, the present invention is not limited thereto, but the structure of each of the lock members 30 can be modified as necessary.

Figure 18:
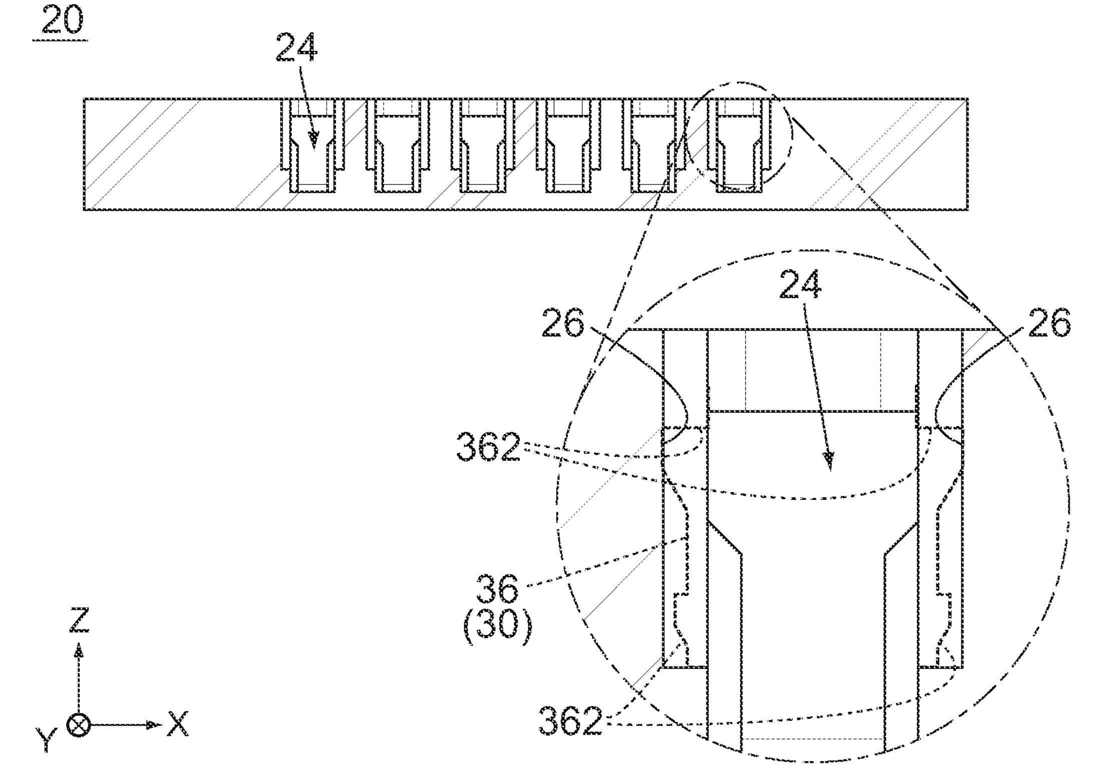
FIG. 18 is a cross-sectional view showing the holding member of FIG. 17, taken along line XVIII-XIII, wherein a part of the holding member enclosed by chain dotted lines is enlarged and illustrated, and in the enlarged view, an outline of the contact held by the holding member is partially illustrated with dashed line.

Referring to FIGS. 13 and 18, for each of the lock members 30, the held portion 36 is press-fit into and held by the holding portions 26 of the corresponding accommodation hole 24 of the holding member 20. In detail, two of the press-fit projections 362 of each of the held portions 36 are pressed outward against wall surfaces of the corresponding two holding portions 26 in the X-direction, respectively, and the other two of the press-fit projections 362 of each of the held portions 36 are pressed against bottom surfaces of the corresponding two holding portions 26, respectively. Thus, each of the held portions 36 is fixed to be unmovable relative to the holding member 20.

Figure 19:
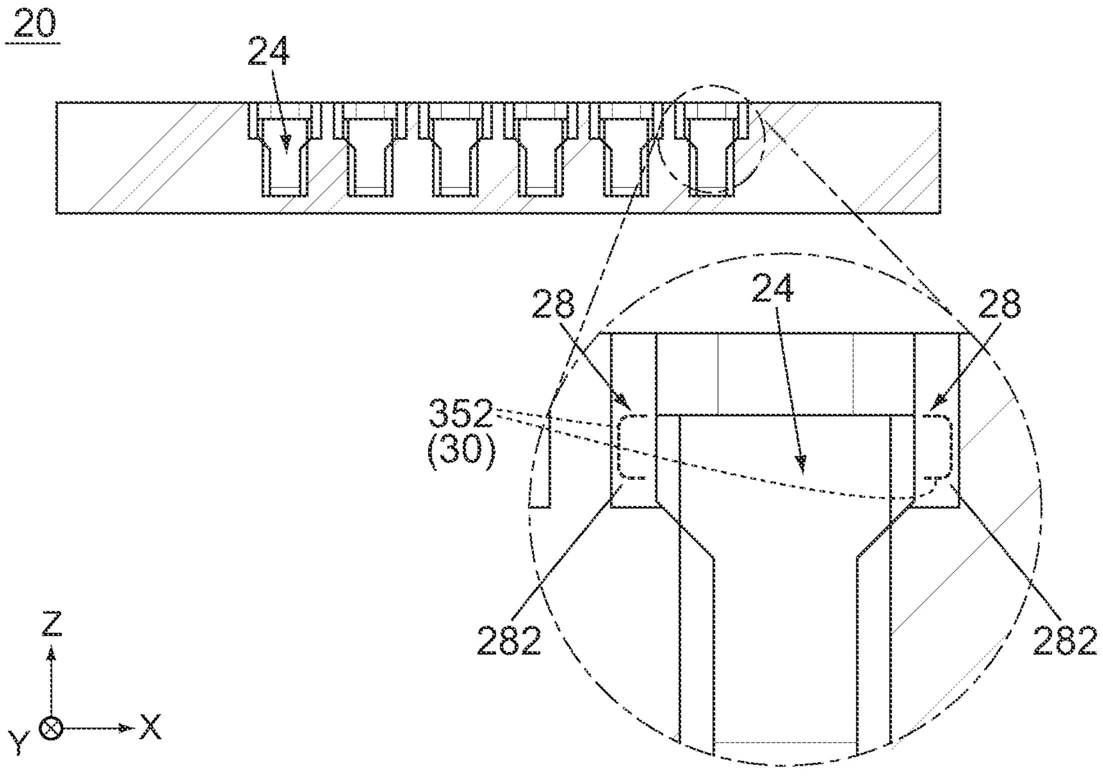
FIG. 19 is a cross-sectional view showing the holding member of FIG. 17, taken along line XIX-XIX, wherein a part of the holding member enclosed by chain dotted lines is enlarged and illustrated, and in the enlarged view, an outline of the contact held by the holding member is partially illustrated with dashed line.

Referring to FIGS. 13, 17 and 19, for each of the lock members 30, the two guide projections 352 are received in the two guide channels 28 of the corresponding accommodation hole 24, respectively. Each of the guide projections 352 is apart from a bottom surface of the corresponding guide channel 28 and is apart from a side wall surface of the corresponding guide channel 28, the side wall surface being located at an outer side the corresponding guide channel 28 in the X-direction. In addition, each of the guide projections 352 is apart from the stop portion 282 and the facing portion 284 of the corresponding guide channel 28 in the Y-direction and is located between the stop portion 282 and the facing portion 284 in the Y-direction. Each of the thus-located guide projections 352 is movable relative to the holding member 20. Thus, referring to FIG. 13, for each of the lock members 30, the whole coupling portion 33 is supported by the holding member 20 to be resiliently deformable.

Referring to FIG. 11, when the holding member 20 is mounted on the circuit board 70, each of the connection portions 37 of the lock members 30 is fixed on and connected to the corresponding conductive pad 72 via soldering, etc. Referring to FIG. 13, each of the lock portions 39 of the lock members 30 projects into the receiving portion 22.

Referring to FIG. 26, under the mated state, the lock projections 32 of the lock members 30 are brought into contact with the mating contact portions 68 of the mating lock members 60, respectively. As a result, the connector 12 is electrically connected with the mating connector 16, and thereby the module (not shown) with the connector 12 works. Under the mated state, the mating lock portion 69 of each of the mating lock members 60 is located over the lock portion 39 of the lock member 30 to prevent the connector 12 from unintentionally coming off the mating connector 16. Thus, the lock portions 39 and the mating lock portions 69 are configured to lock the mated state.

According to the present embodiment, the connector 12 comprises a plurality of the contacts 30 which work as the lock members 30, and the mating connector 16 comprises a plurality of the mating contacts 60 which work as the mating lock members 60. Thus, each of the contacts 30 and the mating contacts 60 of the present embodiment works as a member for locking the mated state as well as works as a member for electrical connection. According to the present embodiment, the connector assembly 10 can be reduced in size while the mated state is securely locked by a large number of the lock portions 39 and a large number of the mating lock portions 69.

According to the present embodiment, the contacts 30 are linearly arranged, and the mating contacts 60 are linearly arranged. However, the present invention is not limited thereto. For example, the contacts 30 may be arranged in a ring shape, and the mating contacts 60 may be arranged in a ring shape. The number of the contacts 30 may be one, and the number of the mating contacts 60 may be one.

Hereafter, explanation will be made about one of the contacts 30 and the corresponding mating contact 60 thereof which are under the mated state. The explanation described below is applicable to each of the contacts 30 and the corresponding mating contact 60 thereof.

Referring to FIG. 26, the lock portion 39 of the lock member 30 is located below the mating lock portion 69 of the mating lock member 60 and faces the mating lock portion 69 in the Z-direction under the mated state. For example, when the connector 12 is moved upward from the mating connector 16 because of impact applied thereto, the lock portion 39 is brought into abutment with the mating lock portion 69, and thereby the connector 12 is prevented from coming off the mating connector 16. Thus, the lock portion 39 locks the mated state together with the mating lock portion 69.

Figure 27:
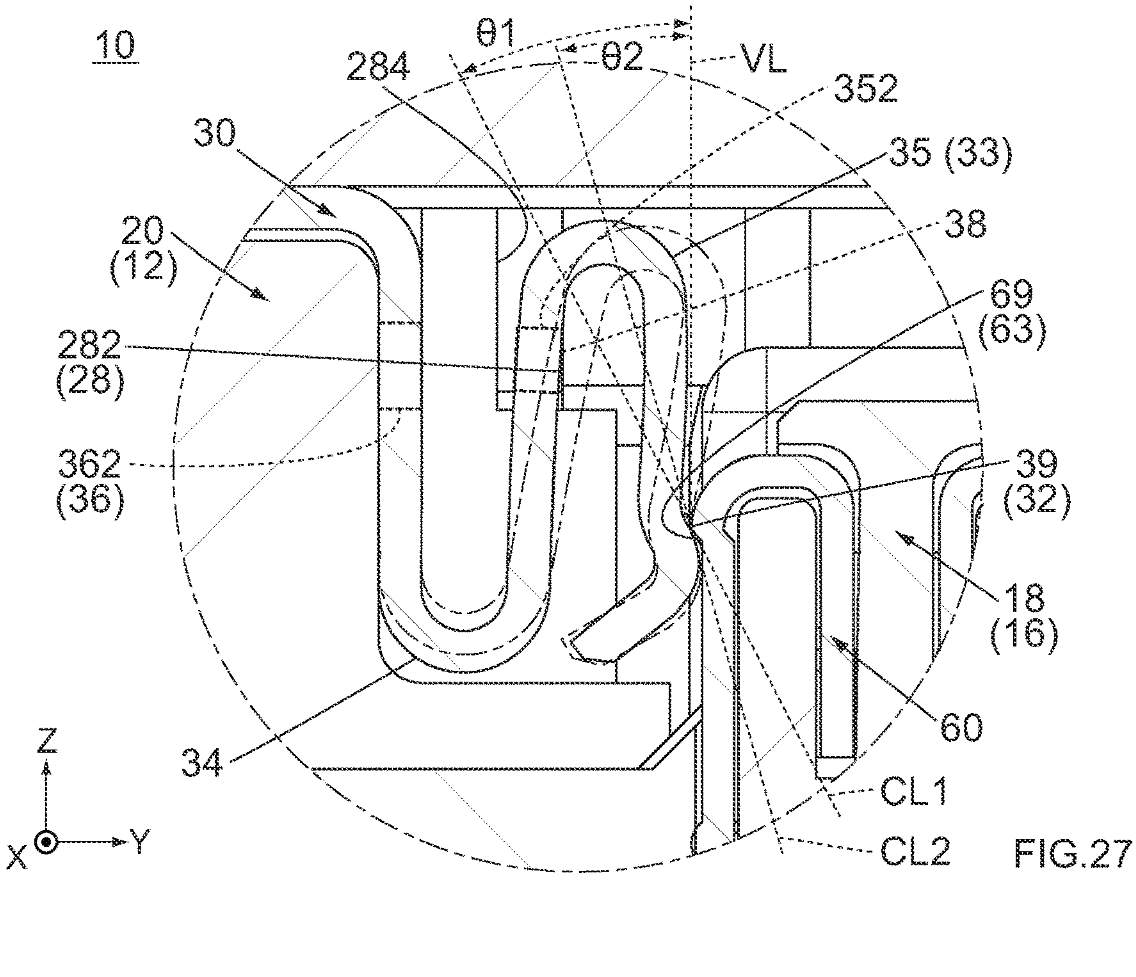
FIG. 27 is another cross-sectional view showing the connector assembly of FIG. 26, wherein the connector is moved upward from the mating connector, and a position of an assumed contact which is not provided with the guide projection is partially illustrated with two-dot chain line.
Figure 28:
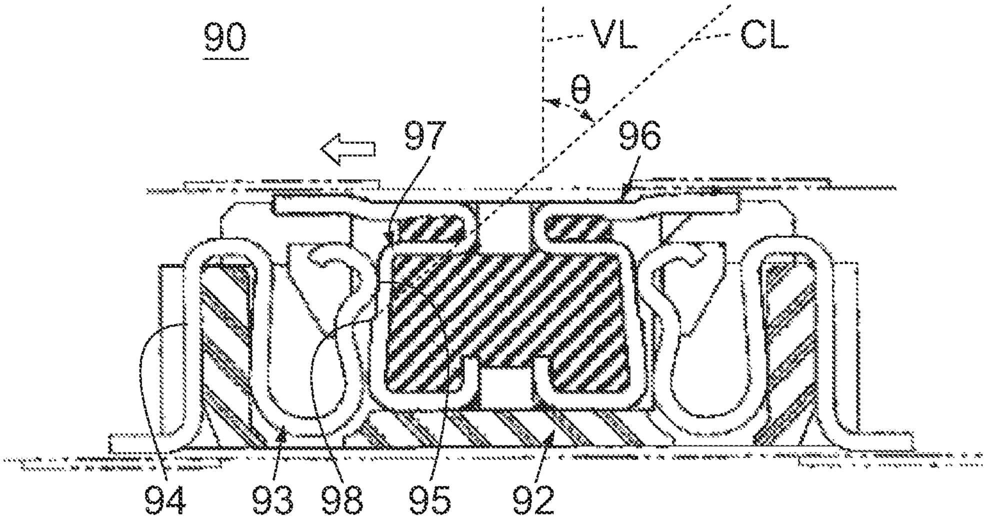
FIG.28 PRIOR ART
FIG. 28 is a cross-sectional view showing a connector assembly of Patent Document 1.

Referring to FIGS. 26 and 27, when the connector 12 under the mated state is removed from the mating connector 16, the connector 12 is pulled upward. The lock portion 39 of the thus-pulled connector 12 is brought into abutment with the mating lock portion 69. When the connector 12 is continuously pulled upward, the coupling portion 33 of the lock member 30 is resiliently deformed. In particular, the second bent portion 35 of the coupling portion 33 is moved in such a way that the second bent portion 35 is dragged by the mating lock portion 69, and the coupling portion 33 is resiliently deformed so that the second bent portion 35 is inclined toward the mating lock member 60 in the Y-direction. Meanwhile, the lock portion 39 is moved so as to be turned about a contact point between the lock portion 39 and the mating lock portion 69, and the abutment portions 38 are brought into abutment with the stop portions 282, respectively.

Referring to the coupling portion 33 illustrated with two-dot chain line in FIG. 27, if the abutment portions 38 which work as described above are not provided, the coupling portion 33 would continue to be resiliently deformed in accordance with the upward movement of the connector 12 so that the second bent portion 35 is inclined. This resilient deformation makes a contact angle 82 small. The contact angle 82 is the angle of inclination of a tangent line CL 2, which passes the lock portion 39, relative to a vertical line VL in parallel to the Z-direction. In other words, the tangent line CL 2 is close to the vertical line VL, and thereby the lock portion 39 becomes easy to come off the mating lock portion 69. In contrast, according to the present embodiment, the resilient deformation of the coupling portion 33 is reduced since the abutment portions 38 are brought into abutment with the stop portions 282, and thereby a contact angle 81 is kept large. The contact angle 81 is the angle of inclination of a tangent line CL 1, which passes the lock portion 39, relative to the vertical line. As a result, the lock of the mated state by the lock portion 39 and the mating lock portion 69 is maintained.

Summarizing the explanation described above, according to the present embodiment, when the lock portion 39 is moved toward the held portion 36 in the Y-direction in accordance with removal of the connector 12 from the mating connector 16 under the mated state, the abutment portions 38 are brought into abutment with the stop portions 282 so that a movement of the lock portion 39 is restricted. As a result, the lock member 30 is prevented from being resiliently deformed in such a way that the lock portion 39 easily come off the mating lock portion 69. For example, even when the connector 12 receives impact and is moved upward from the mating connector 16, the lock portion 39 of the present embodiment hardly comes off the mating lock portion 69. Thus, the present embodiment provides the new connector assembly 10 which has a more reliable lock mechanism.

Each of the stop portions 282 of the present embodiment is the inner wall 282 of the two inner walls 282 and 284 of the guide channel 28 and is located inward of the inner wall 284 in the Y-direction. In other words, each of the inner walls 282 of the guide channel 28 works as the stop portion 282. Moreover, each of the stop portions 282 is located between the abutment portion 38 and the lock portion 39 of the lock member 30 in the Y-direction. However, the present invention is not limited thereto. For example, in an instance where the second bent portion 35 has a U-like shape in the YZ-plane, the inner wall 284 of the two inner walls 282 and 284 of the guide channel 28, which is located outward of the inner wall 282 in the Y-direction, may work as the stop portion. Thus, each of the abutment portions 38 of the lock member 30 may be located between the stop portion and the lock portion 39 in the Y-direction.

According to the present embodiment, one of the two inner walls 282 and 284 of the guide channel 28 works as the stop portion 282. When the guide projection 352 is in abutment with the stop portion 282, which is one of the two inner walls 282 and 284, in accordance with the removal of the connector 12 from the mating connector 16 under the mated state, the guide projection 352 is apart from the facing portion 284, which is a remaining one of the inner walls 282 and 284. According to the present embodiment, the guide projection 352 can be moved so as to be turned about a contact point between the guide projection 352 and the stop portion 282 in the YZ-plane even when the guide projection 352 is in abutment with the stop portion 282. Therefore, spring characteristics of the whole coupling portion 33 can be maintained.

The present invention is not limited to the present embodiment described above. For example, the guide projection 352 may be temporarily brought into abutment with the facing portion 284 when the guide projection 352 is in abutment with the stop portion 282. However, according to this modification, when the guide projection 352 is brought into abutment with the stop portion 282 and the facing portion 284, only a part of the coupling portion 33 which is located inward of the guide projection 352 in the Y-direction works as a spring portion. Thus, a spring length of the coupling portion 33 becomes short, and thereby a spring of the coupling portion 33 becomes hard. As a result, the lock member 30 might be plastically deformed. Therefore, the present embodiment is preferable from a viewpoint of keeping the spring of the coupling portion 33 soft.

The present embodiment can be further variously modified as described below in addition to the already described various modifications.

Referring to FIG. 16, according to the present embodiment, each of the guide channels 28 is provided with two portions consisting of the stop portion 282 and the facing portion 284. However, the present invention is not limited thereto, but each of the guide channels 28 may be provided with only the stop portion 282. For example, a step recessed outward in the X-direction may be formed instead of the guide channel 28. In this instance, a wall surface of the step may work as the stop portion 282. Moreover, a projecting portion partially projecting inward in the X-direction may be formed instead the guide channel 28. In this instance, a wall surface of the projecting portion may work as the stop portion 282.

Referring to FIG. 24 together with FIG. 17, according to the present embodiment, the lock member 30 is provided with the two guide projections 352, and the guide channels 28 are provided with the two stop portions 282 which correspond to the guide projections 352, respectively. This structure enables each of the guide projections 352 to be securely kept in the corresponding guide channel 28. However, the present invention is not limited thereto. For example, the number of the stop portions 282 may be one. Moreover, when the projecting portion partially projecting inward in the X-direction is formed instead of the guide channel 28, the guide projection 352 does not need to be provided.

What is claimed is:

1. A connector assembly comprising a connector and a mating connector, wherein:
the connector is mateable with the mating connector, which is located below the connector in an upper-lower direction, along the upper-lower direction;
the mating connector comprises a mating holding member and a mating lock member;
the mating holding member holds the mating lock member;
the mating lock member has a mating lock portion;
the mating lock portion faces at least downward;
the connector comprises a holding member and a lock member;
the holding member has a holding portion and a stop portion;
the lock member has a held portion, a lock portion, and a coupling portion;
the held portion is held by the holding portion;
the lock portion and the mating lock portion are configured to lock a mated state where the connector and the mating connector are mated with each other;
the coupling portion couples the held portion and the lock portion to each other;
the lock portion is located below the mating lock portion and faces the mating lock portion in the upper-lower direction under the mated state;
the coupling portion has an abutment portion;
when the lock portion is moved toward the held portion in a first horizontal direction perpendicular to the upper-lower direction in accordance with removal of the connector from the mating connector under the mated state, the abutment portion is brought into abutment with the stop portion so that a movement of the lock portion is restricted;
the coupling portion has a first bent portion and a second bent portion;
the first bent portion has a U-like shape;
the second bent portion has a reversed U-like shape;
the first bent portion is located between the second bent portion and the held portion; and
the stop portion is located between the abutment portion and the lock portion in the first horizontal direction.

2. A connector assembly comprising a connector and a mating connector, wherein:
the connector is mateable with the mating connector, which is located below the connector in an upper-lower direction, along the upper-lower direction;
the mating connector comprises a mating holding member and a mating lock member;
the mating holding member holds the mating lock member;
the mating lock member has a mating lock portion;
the mating lock portion faces at least downward;
the connector comprises a holding member and a lock member;
the holding member has a holding portion and a stop portion;
the lock member has a held portion, a lock portion, and a coupling portion;
the held portion is held by the holding portion;
the lock portion and the mating lock portion are configured to lock a mated state where the connector and the mating connector are mated with each other;
the coupling portion couples the held portion and the lock portion to each other;
the lock portion is located below the mating lock portion and faces the mating lock portion in the upper-lower direction under the mated state;
the coupling portion has an abutment portion;
when the lock portion is moved toward the held portion in a first horizontal direction perpendicular to the upper-lower direction in accordance with removal of the connector from the mating connector under the mated state, the abutment portion is brought into abutment with the stop portion so that a movement of the lock portion is restricted;
the lock member has a guide projection;
the guide projection projects in a second horizontal direction perpendicular to both the upper-lower direction and the first horizontal direction;
the abutment portion is a part of the guide projection;
a guide channel is provided in the holding member;
the guide channel is recessed in the second horizontal direction and extends in the upper-lower direction;
the guide channel includes an inner wall which intersects with the first horizontal direction; and
the inner wall works as the stop portion.

3. The connector assembly as recited in claim 2, wherein:
the inner wall of the guide channel includes two inner walls;
the two inner walls are apart from each other in the first horizontal direction;
one of the two inner walls works as the stop portion; and
when the guide projection is in abutment with the one of the two inner walls in accordance with the removal of the connector from the mating connector under the mated state, the guide projection is apart from a remaining one of the two inner walls.

4. The connector assembly as recited in claim 1, wherein the held portion is fixed to be unmovable relative to the holding member.

5. The connector assembly as recited in claim 1, wherein:
the connector comprises a plurality of contacts;
the mating connector comprises a plurality of mating contacts which correspond to the contacts, respectively;
each of the contacts works as the lock member; and
each of the mating contacts works as the mating lock member.

6. The connector assembly as recited in claim 2, wherein the held portion is fixed to be unmovable relative to the holding member.

7. The connector assembly as recited in claim 2, wherein:
the connector comprises a plurality of contacts;
the mating connector comprises a plurality of mating contacts which correspond to the contacts, respectively;
each of the contacts works as the lock member; and each of the mating contacts works as the mating lock member.

* * * * *